(12) United States Patent
Hubbard et al.

(10) Patent No.: US 7,557,729 B2
(45) Date of Patent: Jul. 7, 2009

(54) METHOD AND SYSTEM FOR VALIDATION, ESTIMATION AND EDITING OF DAILY METER READ DATA

(75) Inventors: David Hubbard, Brooklyn Park, MN (US); John Skog, Olympia, WA (US); Venkatesh Ramachandran, Bangalore (IN)

(73) Assignee: Ecologic Analytics, LLC, Bloomington, MN (US)

( * ) Notice: Subject to any disclaimer, the term of this patent is extended or adjusted under 35 U.S.C. 154(b) by 139 days.

(21) Appl. No.: 11/059,089

(22) Filed: Feb. 7, 2005

(65) Prior Publication Data

US 2005/0234837 A1    Oct. 20, 2005

Related U.S. Application Data

(60) Provisional application No. 60/542,488, filed on Feb. 5, 2004.

(51) Int. Cl.
*G08B 23/00* (2006.01)
(52) U.S. Cl. .............................. 340/870.02; 324/158.1; 700/291; 705/412
(58) Field of Classification Search ............ 340/870.02, 340/870.03, 870.4; 324/158.1; 700/291; 705/412
See application file for complete search history.

(56) References Cited

U.S. PATENT DOCUMENTS

| | | | | |
|---|---|---|---|---|
| 6,163,276 | A * | 12/2000 | Irving et al. ............. | 340/870.4 |
| 6,671,636 | B2 * | 12/2003 | Dawson ..................... | 702/62 |
| 6,677,862 | B1 * | 1/2004 | Houlihane et al. ..... | 340/870.03 |
| 6,819,098 | B2 * | 11/2004 | Villicana et al. ......... | 324/158.1 |
| 6,856,257 | B1 * | 2/2005 | Van Heteren .......... | 340/870.03 |
| 6,885,309 | B1 * | 4/2005 | Van Heteren .......... | 340/870.11 |
| 7,230,544 | B2 * | 6/2007 | Van Heteren .......... | 340/870.03 |

* cited by examiner

*Primary Examiner*—Albert K Wong
(74) *Attorney, Agent, or Firm*—Schwegman, Lundberg & Woessner, P.A.

(57) ABSTRACT

A method for processing daily consumption, demand and time of use meter reads for electric, gas, water and other metered entities. The meter reads are collected by any of the well known Automated Meter Reading (AMR) technologies and loaded into a meter data warehouse. At a minimum daily meter reading, reads that are tagged as Good, Stale, Partial, Incomplete and Missing are required for properly identifying usage patterns, applying rules for error patterns and estimating the reads which will provide quality meter reads to the utilities thereby identifying meter problems before they become billing problems. The overall process involves loading the daily meter reads into a database, comparing each meter read against its previous day's read and applying a set of rules that help in validating, editing and estimating (VEE) of this data. The VEE rules that are applied can be broadly classified into five (5) categories. They are 1) Cumulative (CUM) Read Error Detection 2) Demand (DEM) read Error Detection 3) Rounding, Truncation and Offset rules 4) Allocation and Estimation 5) Others. Once these rules have been applied and the required reading estimated and edited, the data is now ready for billing. Prior to the reads being used for billing, another process is executed that helps to determine the meters that need to be replaced and hence whose reads cannot be used for billing as it would result in the customer being billed for incorrect usage. The output of this process can be customized to suit any of the popular Utility Billing Systems (UBS)'s input format and mimics a meter exchange transaction.

30 Claims, 14 Drawing Sheets

METHOD AND SYSTEM FOR VALIDATION, ESTIMATION AND EDITING OF DAILY METER READ DATA

CROSS-REFERENCE TO RELATED APPLICATIONS

This application claims priority to provisional application Ser. No. 60/542,488 filed Feb. 5, 2004.

BACKGROUND OF THE INVENTION

1. Field of the Invention

The present invention relates generally to methods for processing daily consumption of demand and time of use meter readings for electronic, gas, water and other metered entities, and, more particularly relates to validating, editing and estimating of such data for billing purposes and customer presentation by utility companies.

2. Description of the Prior Art

Revenue metering and meter operations have a rich tradition of being very accurate and stable processes within utilities. The goals of +99% accuracy and timely delivery of billing reads has been the undisputed standard for decades. With the advent of AMR, a new metering paradigm has been created. Data delivery requirements have been increased by several magnitudes; monthly delivery has been replaced by daily and even hourly delivery. Accuracy has also improved, errors associated with misreads, can't reads and data entry errors are virtually non-existent.

The notion that AMR delivers more data with higher accuracy is universally held within the industry. This notion is true for most meters but not all. The reality of AMR metering is that along with increases in accuracy and data delivery comes a new level of complexity and a variety of new failure mechanisms. The flow of data from the meter to the billing system while untouched by human hands goes through numerous software processes and hardware devices that must be monitored and controlled closely.

To further complicate the AMR paradigm, utilities have added the element of timing to the metering equation for a large population of meters. Not only does the quantity of energy used need to be accurately recorded but also so does the time of usage. It is no longer acceptable to report energy usage over a 30 or 60-day cycle as a single event, it now must be reported daily at the beginning and end of four or more distinct time periods.

Along with this new complexity, AMR ushers in new opportunities and a requirement to re-assess the traditional metering paradigm. No longer does the identification of meter problems take months, problems can be identified and corrected in days. The need to estimate energy usage is reduced in both scope and volume. With daily reporting of energy usage; billing reads are generally no older than 24 hours and if a read is unavailable, only a short time period of consumption must be estimated. In most cases, with AMR, only known usage now must be allocated to the appropriate day or bin.

SUMMARY OF THE INVENTION

It is therefore an object of the present invention to provide a method for analyzing any data at a particular frequency such as daily meter reading data, comparing it to a reference point such as the previous day's data for the same meter and categorizing the read as a good accurate read which can be used for billing purposes.

It is another object of the present invention to provide a method for identifying meter resets, error conditions, rounding errors and provide a means for validating, estimating and editing of the data.

It is yet another object of the present invention to reclaim lost revenue by identifying and processing reset meters.

It is yet another object of the present invention to smoothen data so as to provide good quality data for presentation to end customers.

It is yet another object of the present invention to help the end customer correlate what they are seeing via the utility presentation application with what they are being billed.

It is therefore an advantage of the present invention to provide a method for analyzing any data at a particular frequency such as daily meter reading data, comparing it to a reference point such as the previous day's data for the same meter and categorizing the read as a good accurate read which can be used for billing purposes.

It is another advantage of the present invention to provide a method for identifying meter resets, error conditions, rounding errors and provide a means for validating, estimating and editing of the data.

It is yet another advantage of the present invention to reclaim lost revenue by identifying and processing reset meters.

It is yet another advantage of the present invention to smoothen data so as to provide good quality data for presentation to end customers.

It is yet another advantage of the present invention to help the end customer correlate what they are seeing via the utility presentation application with what they are being billed.

DETAILED DESCRIPTION OF THE PREFERRED EMBODIMENTS

For purposes of this invention the following terms when used stand for the following definitions.

| Term | Description |
|---|---|
| CUM | Cumulative meter read. This is the most basic measurement done by an electric meter and traditionally the meter reader would get reads once per month that would be a cumulative value. The billing system calculates the USAGE and bills the customer appropriately |
| KWH | Kilo Watt Hours |
| TOU | Time of Use. Any cumulative demand can be measured on a time of use basis. These kinds of meters traditionally have a clock in them and these reads involves tracking when the electricity was actually consumed. Since the price of electricity fluctuates during the day, billing a customer based on the time of his consumption is a fair billing process and usually saves both the customer and the utility money. |
| DEM | Demand. These types of reading tracks the maximum value of the electricity in a given period of time. |
| KW | Kilo Watts |
| USAGE | Difference between current month's/day's meter read and last month's/day's meter read. The actual energy that was consumed by the customer during the billing month/day. Usage is the delta between two values at varying points of time. |
| Good Read | A meter read that falls in the acceptable read window from the bill date. In the traditional scenario, if a customer was supposed to be read on 25-MAR for instance, there would generally be an acceptable read window of +2 and −2 days to allow for the meter reader sufficient time to read. With the advent of AMR, this window had shrunk drastically to enable more revenue to be collected. |

-continued

| Term | Description |
|---|---|
| Stale Read | A meter read that falls outside the acceptable read window, usually an older read. |
| Partial Read | This applies only to TOU meters. In order to measure the consumption of a customer based on time of the day, utilities divide the 24 hour day in multiple buckets, wherein each bucket has a different price for electricity. These are referred to as BINS or Time of Use buckets. In order to have a complete read from a TOU meter, the consumption for the entire 24 month period must be known. If the partial readings and the concept of tagging readings as such can be applied to all readings and not just to TOU readings. Partial reads are defined as those reads that are not stale and do not completely represent date for the respective time period. |

The present invention and embodiments thereof are not limited to a specific AMR technology, computer platform, data storage software (RDBMS) and maybe be implemented in a variety of situations where daily meter reading data from electric, water, gas, steam and other utility metered data is stored.

Figure 1:
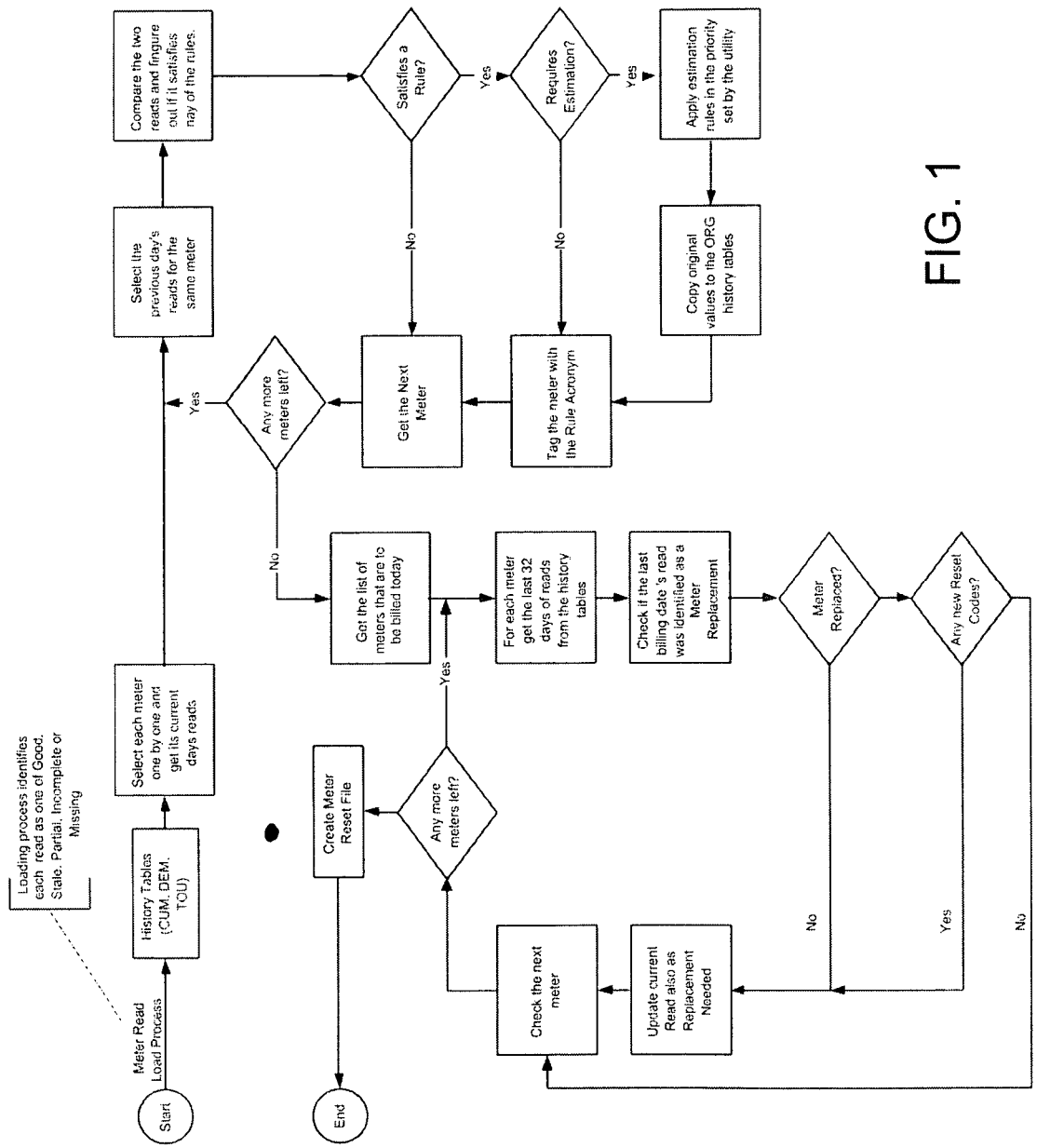
FIG. 1 illustrates in flow chart form a preferred embodiment of the present invention. The flow chart depicts the overall process flow of validating, estimating, and editing meter read data

Referring to FIG. 1, an illustration in block diagram form of a presently preferred embodiment of the present invention is presented. The approach is logical and straight forward and employs these key steps:

Loading the raw meter read data set from any AMR technology. It should be available and the loading process should be able to identify the reads as Good, Stale, Partial, Incomplete or Missing.

Performing Error Checking, Estimation and Allocation processes

Processing the meters that are to be billed today by the utility, typically ½0 of their entire population.

Checking for a meter or AMR device replacement based on the last rule and any new reset rules since this meter was billed.

Creating the Meter Reset file to be processed by the UBS.

Creating Summary Report

FIG. 1 illustrates in flow chart form a preferred embodiment of the present invention. The flow chart depicts the overall process flow from receiving the raw meter reads data to processing the data through the current invention. While the meter read loading process and its logic are not part of this invention, the present invention depends on the loading process and its ability to identify and tag the meter reads as Good, Stale, Partial, Incomplete and Missing.

Once the meter reads are loaded (step 5) the current invention and its processes are initiated (step 10.) In step 15, the current reads for all the meters are obtained along with the previous day's reads for every meter and compared (step 25) to check for errors or data patterns. If any of the rules (described with reference to FIGS. 2-13) are satisfied (step 30) and if estimation is required (step 40) then the appropriate estimate is applied in the priority set by the utility (step 45.)

It is assumed that all billing systems have a method to process a meter exchange in between the two billing dates for the meter. The virtual meter exchange process emulates this process on the day of the reset and hence recovers revenue that would have been potentially lost.

Figure 2:
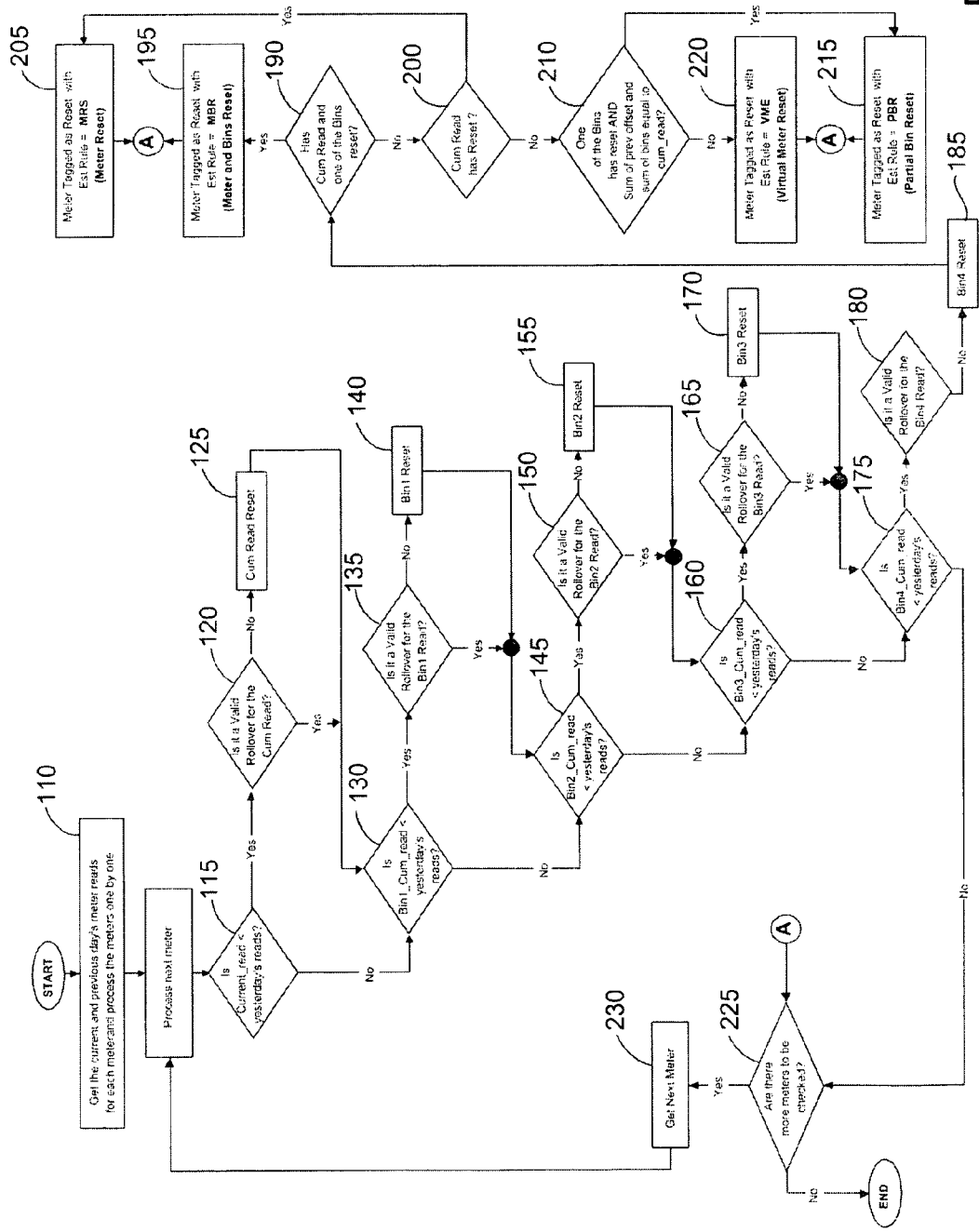
FIG. 2 illustrates in flow chart form a presently preferred embodiment of the present invention, specifically processing cumulative meter read data.

FIG. 2 illustrates in flow chart form a presently preferred embodiment of the present invention. In step 110, current reads for each meter along with the previous day's for the same meter are obtained. The meters are then processed for reset one by one (step 112.) In a preferred embodiment of the invention, each of the meters has five values: the cumulative read, bin 1 cumulative read, bin 2 cumulative read, bin 3 cumulative read, bin 4 cumulative read, and bin 5 cumulative read. In step 115, the current read is measured as against the previous day's read and if the current read is lower than the previous day's read, in the next step 120 a determination is made on whether it is a valid rollover for the cumulative read. If it is not a valid rollover the cumulative read is reset in step 125. If however, the current read is greater than or equal to the previous day's read and if the bin 1 cumulative read is lower than the previous day's read (step 130) then the next step 135 involves a determination of whether it is a valid rollover for the bin 1 cumulative read. If it is not a valid rollover the bin 1 cumulative read is reset in step 140. If however, the bin 1 cumulative read is greater than the previous day's reads then bin 2 cumulative read is measured against the previous day's reads (step 145.) If the bin 2 cumulative read is lower than the previous day's read (step 145) then the next step 150 involves a determination of whether it is a valid rollover for the bin 2 cumulative read. If it is not a valid rollover the bin 2 cumulative read is reset (step 155). If however, the bin 2 cumulative read is greater than or equal to the previous day's reads then the next step 160 ensues whereby the bin 3 cumulative read is measured against the previous day's reads and if the bin 3 cumulative read is lower than the previous day's read then the next step 165 involves a determination of whether it is a valid rollover for the bin 3 cumulative read. If it is not a valid rollover the bin 3 cumulative read is reset (step 170). If however, the bin 3 cumulative read is greater than or equal to the previous day's reads then the next step 175 ensues whereby the bin 4 cumulative read is measured against the previous day's reads and if the bin 4 cumulative read is lower than the previous day's read then the next step 180 involves a determination of whether it is a valid rollover for the bin 4 cumulative read. If it is not a valid rollover the bin 4 cumulative read is reset in step 185.

If the cumulative read and one of the bins is reset (step 190) the meter is tagged as Reset and the applicable estimation rule is MBR i.e. Meter and Bins Reset (MBR.) (step 195.) Thus Meter and Bins reset (MBR) refers to a situation wherein the cumulative energy value as well as the TOU values reported by the AMR system indicates negative energy consumption. For this to take place the AMR module has been either partially or fully reset due to a hardware failure or a software failure has taken place causing the bins to decrement. Normally, in such instances replacement of the meter is necessary. See tables 1 and 2.

TABLE 1

| Read time | CUM | BIN 1 | BIN 2 | BIN 3 | BIN 4 |
|---|---|---|---|---|---|
| Jan. 5, 2002 11:59:59 PM | 10059 | 3507 | 646 | 1392 | 1532 |
| Jan. 6, 2002 11:59:59 PM | 10021 | 3505 | 642 | 1384 | 1523 |

TOU and CUM Reads as Delivered by an AMR vendor

TABLE 2

| Read time | Adjusted CUM | BIN 1 | BIN 2 | BIN 3 | BIN 4 | TAG | Offset | Notes |
|---|---|---|---|---|---|---|---|---|
| Jan. 5, 2002 11:59:59 PM | 10058 | 3507 | 646 | 1392 | 1532 | RWT | 2981 | Normal Read, CUM adjusted because of truncation |
| Jan. 6, 2002 11:59:59 PM | 10021 | 3505 | 642 | 1384 | 1523 | MBR | 2967 | CUM and Bins decremented resulting in an MBR tag |

Readings after being processed by the current invention

If only the cumulative read has reset (step 200) the meter is tagged as reset with the applicable estimation rule being MRS i.e. Meter Reset (step 205). Meter Reset (MRS) refers to a situation wherein the cumulative energy value reported by the AMR system indicates negative energy consumption. For this to take place the AMR module has been reset due to a hardware failure and replacement of the meter is probably necessary.

TABLE 3

| Read time | CUM |
|---|---|
| Jan. 1, 2002 11:54:13 PM | 0 |
| Jan. 2, 2002 11:51:08 PM | 2 |
| Jan. 3, 2002 11:58:59 PM | 3 |
| Jan. 4, 2002 11:46:21 PM | 0 |
| Jan. 5, 2002 11:44:26 PM | 1 |
| Jan. 6, 2002 11:58:51 PM | 2 |
| Jan. 7, 2002 11:56:43 PM | 3 |
| Jan. 8, 2002 11:59:49 PM | 5 |
| Jan. 9, 2002 11:57:45 PM | 6 |
| Jan. 10, 2002 11:55:37 PM | 9 |

CUM Reads for a Gas Meter as Delivered by a AMR vendor

TABLE 4

| Read time | CUM | TAG | Notes |
|---|---|---|---|
| Jan. 1, 2002 11:54:13 PM | 0 | | Start |
| Jan. 2, 2002 11:51:08 PM | 2 | | |
| Jan. 3, 2002 11:58:59 PM | 3 | | |
| Jan. 4, 2002 11:46:21 PM | 0 | MRS | CUM Register Reset |
| Jan. 5, 2002 11:44:26 PM | 1 | | |
| Jan. 6, 2002 11:58:51 PM | 2 | | |
| Jan. 7, 2002 11:56:43 PM | 3 | | |
| Jan. 8, 2002 11:59:49 PM | 5 | | |
| Jan. 9, 2002 11:57:45 PM | 6 | | |
| Jan. 10, 2002 11:55:37 PM | 9 | | |

Readings after being processed by the current invention

If only one of the Bins has reset and the sum of previous offset and sum of bins equals the cumulative read (step 210) then the meter is tagged as Reset with the applicable estimation rule being PBR i.e. Partial Bins Reset (step 215.) Partial Bin Reset (PBR) refers to a situation wherein the AMR reads have been reported but the TOU values indicate negative energy consumption for one or more bins but is compensated by one of the other bins, no offset change. Replacement of the meter is not necessary, but a Virtual Meter Exchange (VME) of on CLX is necessary in order to correctly bill the customer at the next read cycle.

TABLE 5

| Read Time | CUM | BIN 1 | BIN 2 | BIN 3 | BIN 4 | FLAG |
|---|---|---|---|---|---|---|
| Oct. 21, 2002 23:59 | 12990 | 3373 | 1757 | 1935 | 1891 | |
| Oct. 22, 2002 23:59 | 13002 | 3370 | 1760 | 1938 | 1900 | PBR |

Readings after being processed by the current invention

If none of the aforementioned rules is applicable the meter is tagged as reset with the applicable estimation rule being VME i.e. Virtual Meter Exchange (step 220.) If that happens the steps of FIG. 1 are repeated on the next meter. Virtual Meter Exchange (VME) refers to a situation wherein the AMR reads have been reported but the TOU values indicate negative energy consumption and the offset calculation results in an offset change. For this to take place, a software failure on the AMR vendor's software has taken place causing the bins to decrement or reset to zero. Replacement of the meter is not necessary, but a Virtual Meter Exchange (VME) on the UBS is necessary in order to correctly bill the customer at the next read cycle.

TABLE 6

| Read Time | CUM | BIN 1 | BIN 2 | BIN 3 | BIN 4 |
|---|---|---|---|---|---|
| Dec. 26, 2001 11:59:59 PM | 24691 | 11769 | 13640 | 11568 | 7698 |
| Dec. 28, 2001 11:59:59 PM | 24985 | 11809 | 13751 | 11647 | 7761 |
| Dec. 29, 2001 11:59:59 PM | 25137 | 11812 | 13808 | 11708 | 7793 |
| Dec. 29, 2001 11:59:59 PM | 25137 | 11812 | 13808 | 11708 | 7793 |
| Dec. 31, 2001 11:59:59 PM | 25471 | 12184 | 13750 | 11740 | 7780 |
| Jan. 1, 2002 11:59:59 PM | 25640 | 12354 | 13750 | 11740 | 7780 |

CUM and TOU Reads provided by an AMR vendor

TABLE 7

| Read Time | Adjusted CUM | BIN 1 | BIN 2 | BIN 3 | BIN 4 | TAG | Notes |
|---|---|---|---|---|---|---|---|
| Dec. 27, 2001 11:59:59 PM | 24691 | 11769 | 13640 | 11568 | 7698 | NHD | |
| Dec. 28, 2001 11:59:59 PM | 24984 | 11809 | 13751 | 11647 | 7761 | RWT | |
| Dec. 29, 2001 11:59:59 PM | 25137 | 11812 | 13808 | 11708 | 7793 | | |
| Dec. 30, 2001 11:59:59 PM | 25137 | 11812 | 13808 | 11708 | 7793 | NHD | Stale Read |
| Dec. 31, 2001 11:59:59 PM | 25470 | 12184 | 13750 | 11740 | 7780 | VME | Bins 2 and 4 decremented |
| Jan. 1, 2002 11:59:59 PM | 25640 | 12354 | 13750 | 11740 | 7780 | | |

Readings after being processed by the current invention

The VME supplies UBS with a set of stop and start reads. The stop reads should be adjusted in order to account for all energy usage. In the above example, the energy consumed on Dec. 31, 2001 seems incorrectly stated if one looks only at the bin readings. Between December 30 and December 31, the CUM reading increased by 333 KWH and the bin values incremented by only 153 KWH. 180 KWH must be added to the stop reading in order to account for all usage. All 333 KWH can be added to the lowest price bin thus guaranteeing that the customer is not over charged or it can be reasonably spread across all bins using resent historical usage trends Once the applicable error detection rule is applied and if there are more meters to be processed (step 225), the aforementioned steps are repeated with the next meter (step 230.)

Figure 3:
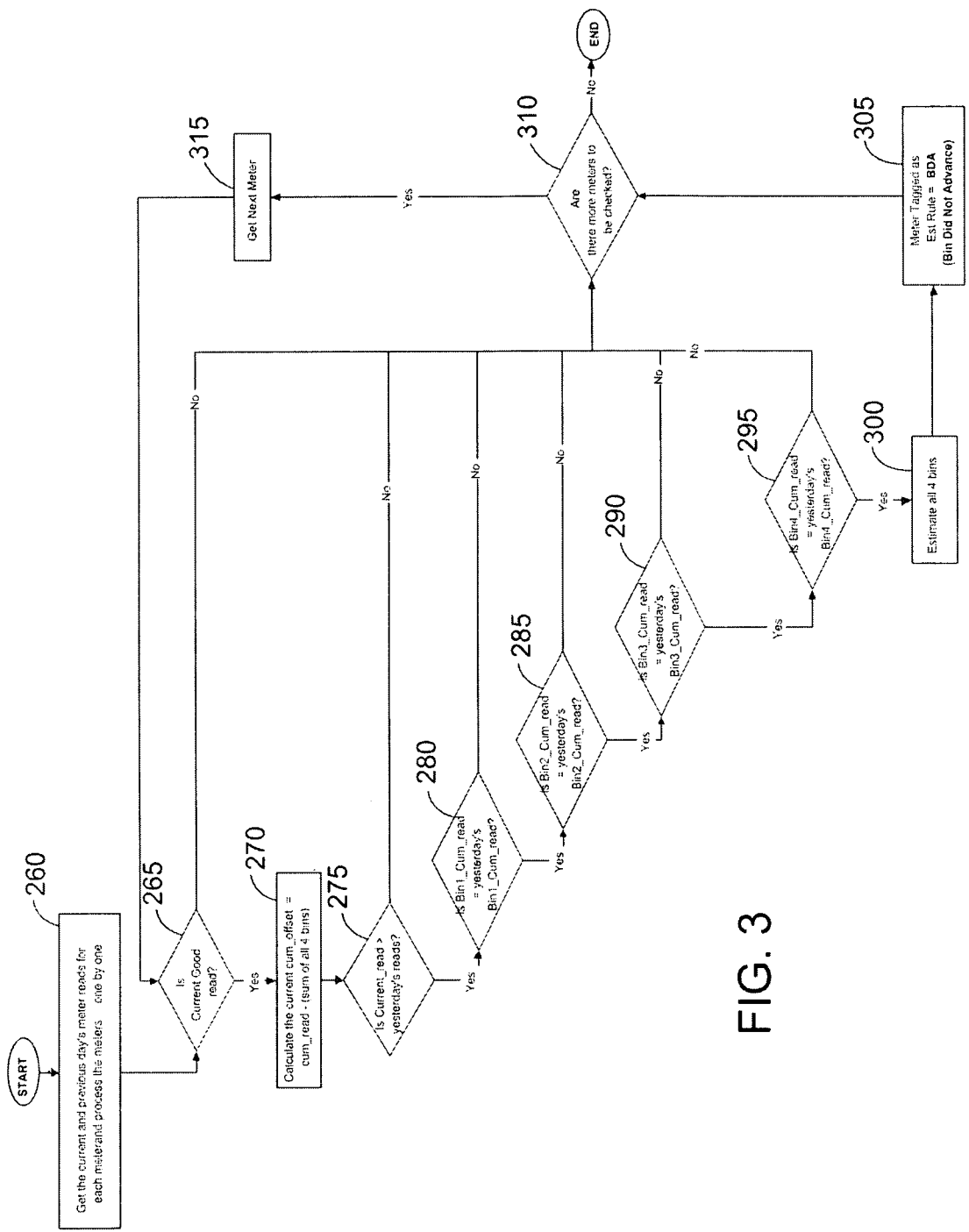
FIG. 3 illustrates in flow chart form a presently preferred embodiment of the present invention. The figure depicts the steps involved in applying one of the rules of the present invention, specifically in relation to further processing of cumulative meter read data.

Referring to FIG. 3, an illustration in flowchart of a preferred embodiment of the present invention is presented. The flow chart depicts the step of getting the current reads and previous day's reads for each meter and processing the meters one by one in step 260. If the current read is good (step 265), the process involves the steps of calculating the current cumulative read offset which is the difference of cumulative reads and the sum of all 4 bins in step 270. If the current read is greater than the previous day's read (step 275) and if bin 1 cumulative read is equal to the previous day's bin 1 cumulative read (step 280) and if bin 2 cumulative read is equal to the previous day's bin 2 cumulative read (step 285) and if bin 3 cumulative read is equal to the previous day's bin 3 cumulative read (step 290) and if bin 4 cumulative read is equal to the previous day's bin 4 cumulative read (step 295) the next step 300 involves estimating all four bins. Such being the case, all four bins are then estimated using one of the rules explained in the section on estimating and the meter is tagged as one where the Bins Did Not Advance (step 305.) An example of such a read is shown below.

TABLE 8

| Read Time | CUM | BIN 1 | BIN 2 | BIN 3 | BIN 4 |
|---|---|---|---|---|---|
| Oct. 19, 2002 | 56152 | 11865 | 2968 | 6938 | 5429 |
| Oct. 20, 2002 | 56152 | 11865 | 2968 | 6938 | 5429 |

If there are other meters to be checked (step 310), the aforementioned steps are repeated with the next meter (315.)

Figure 4:
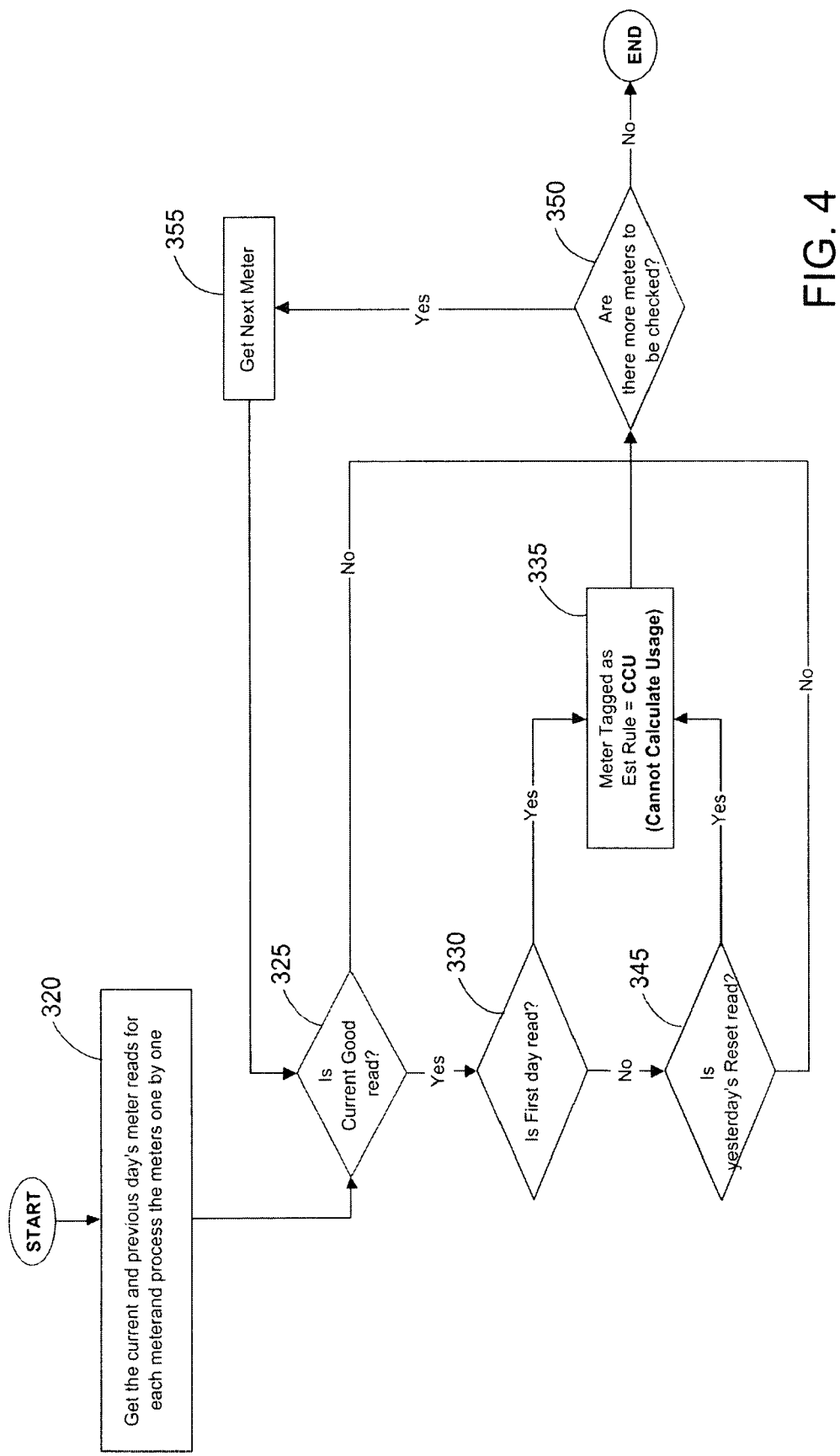
FIG. 4 illustrates in flow chart form a presently preferred embodiment of the present invention. The figure depicts the steps involved in applying one of the rules of the present invention relating to tagging meter read data as Cannot Calculate Usage.

Referring to FIG. 4, an illustration in flowchart of a preferred embodiment of the present invention is presented. The flowchart depicts the steps of getting the current reads for each meter along with the previous day's reads for each meter (step 320). As each meter is processed on-by-one, a determination is made as to whether the current read is good (step 325). A good read being one where the read falls within the acceptable window of the bill read date. If the current read is good then a determination is made as to whether this is the first day's read meaning thereby that the previous day's read does not exist (step 330). If it is the first day's read then the meter is tagged as Cannot Calculate Usage meaning thereby that usage cannot be calculated because the previous day's read did not exist for comparison purposes (step 335). If it is not the first day's read and if the previous day's read is a Reset (step 345.) See table 9 below where the previous day's read was a reset and hence the usage cannot be calculated correctly for today either.

TABLE 9

| Read Time | CUM | Flag |
|---|---|---|
| Oct. 14, 2002 23:59 | 2047 | |
| Oct. 15, 2002 23:22 | 2050 | |
| Oct. 16, 2002 23:59 | 2052 | |
| Oct. 18, 2002 23:40 | 2058 | |

TABLE 9-continued

| Read Time | CUM | Flag |
|---|---|---|
| Oct. 19, 2002 23:59 | 2037 | MRS |
| Oct. 20, 2002 23:56 | 2039 | CCU |

If there are more meters to be checked (step 350) then the aforementioned steps are repeated with the next meter (step 355.)

Figure 5:
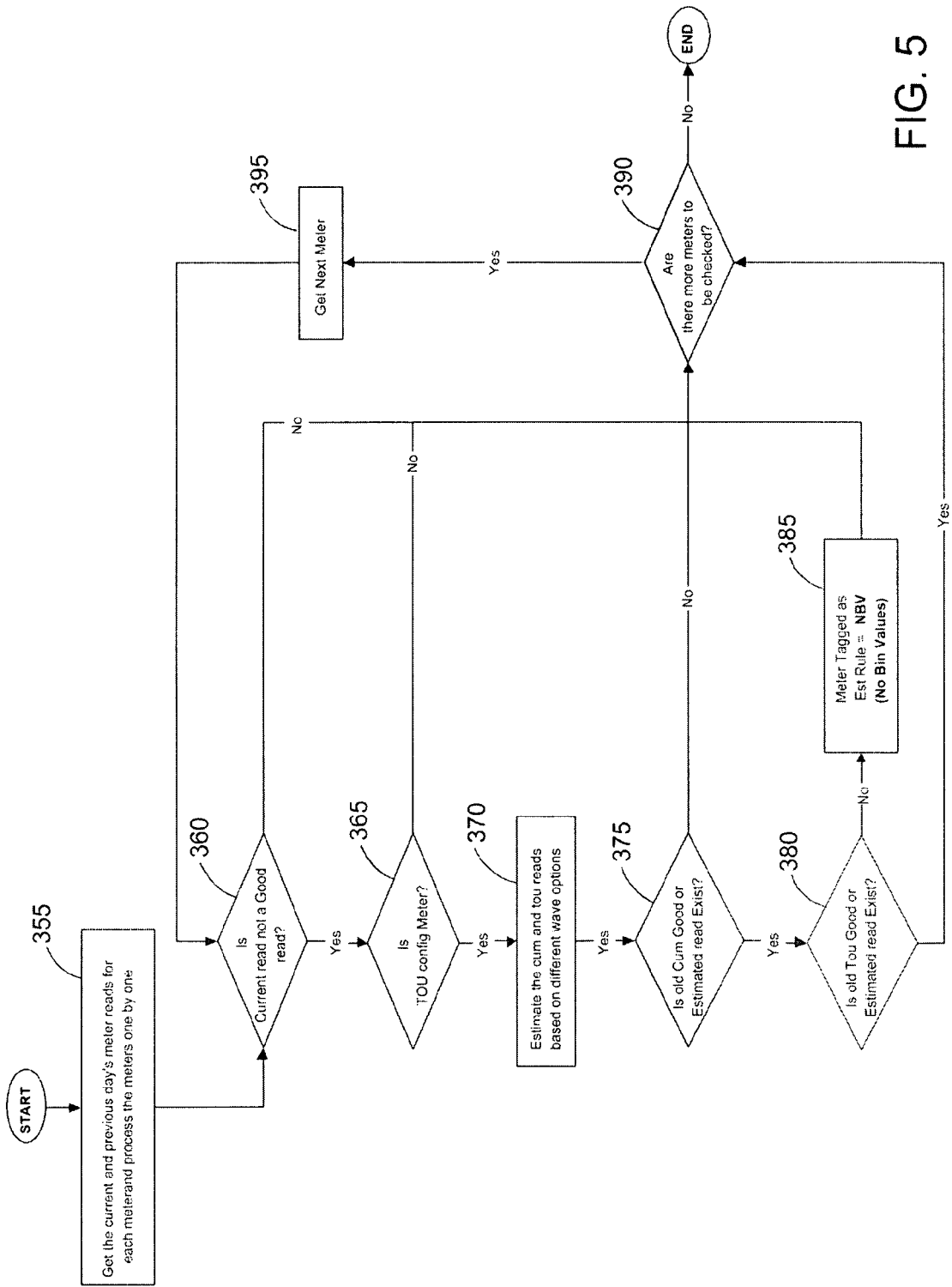
FIG. 5 illustrates in flow chart form a presently preferred embodiment of the present invention. The figure depicts the steps involved in applying one of the rules of the present invention relating to tagging meter read data as No Bin Values.

FIG. 5 illustrates the steps of getting the current reads for each meter along with the previous day's reads for each meter (step 355.) If the current read is not a good read (step 360) and if the TOU is a configured meter then the CUM and TOU reads are estimated (step 370.) If the old CUM read is Good or the Estimated Read exists (step 375) the meter is tagged as No Bin Values (NBV) (step 385.) If not other meters are checked (steps 390, 395.)

Figure 6:
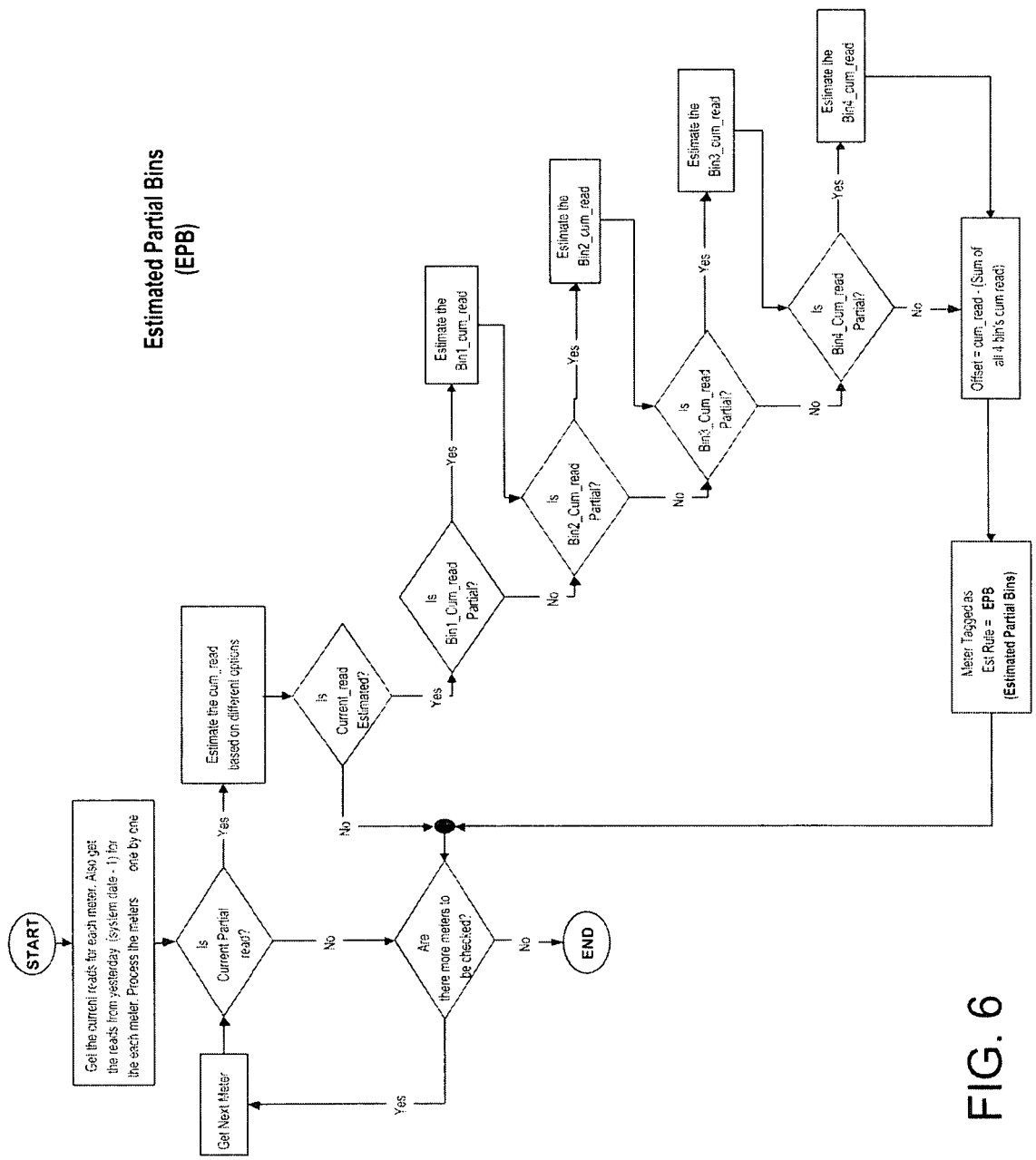
FIG. 6 illustrates in flow chart form a presently preferred embodiment of the present invention. The figure depicts the steps involved in applying one of the rules of the present invention related to tagging meter read data as Estimated Partial Bins.

FIG. 6 illustrates the steps of getting the current reads for each meter along with the previous day's reads for each meter (step 390.) If the current read is a partial read (step 395) then the CUM read is estimated based on different options (step 400.) If the current read is estimated (step 405) and if the Bin 1 CUM read is partial (step 410) then the Bin 1 CUM read is estimated. If Bin 2 CUM read is partial (step 420) then Bin 2 CUM read is estimated (step 425). If Bin 3 CUM read is partial (step 440) then Bin 4 CUM read is estimated. If Bin 4 CUM read is not partial then Offset is calculated (step 450). Offset is equal to difference of CUM read and sum of CUM reads of all 4 bins. In this case the meter is tagged as Estimated Partial Bins (EPB.)

Figure 7:
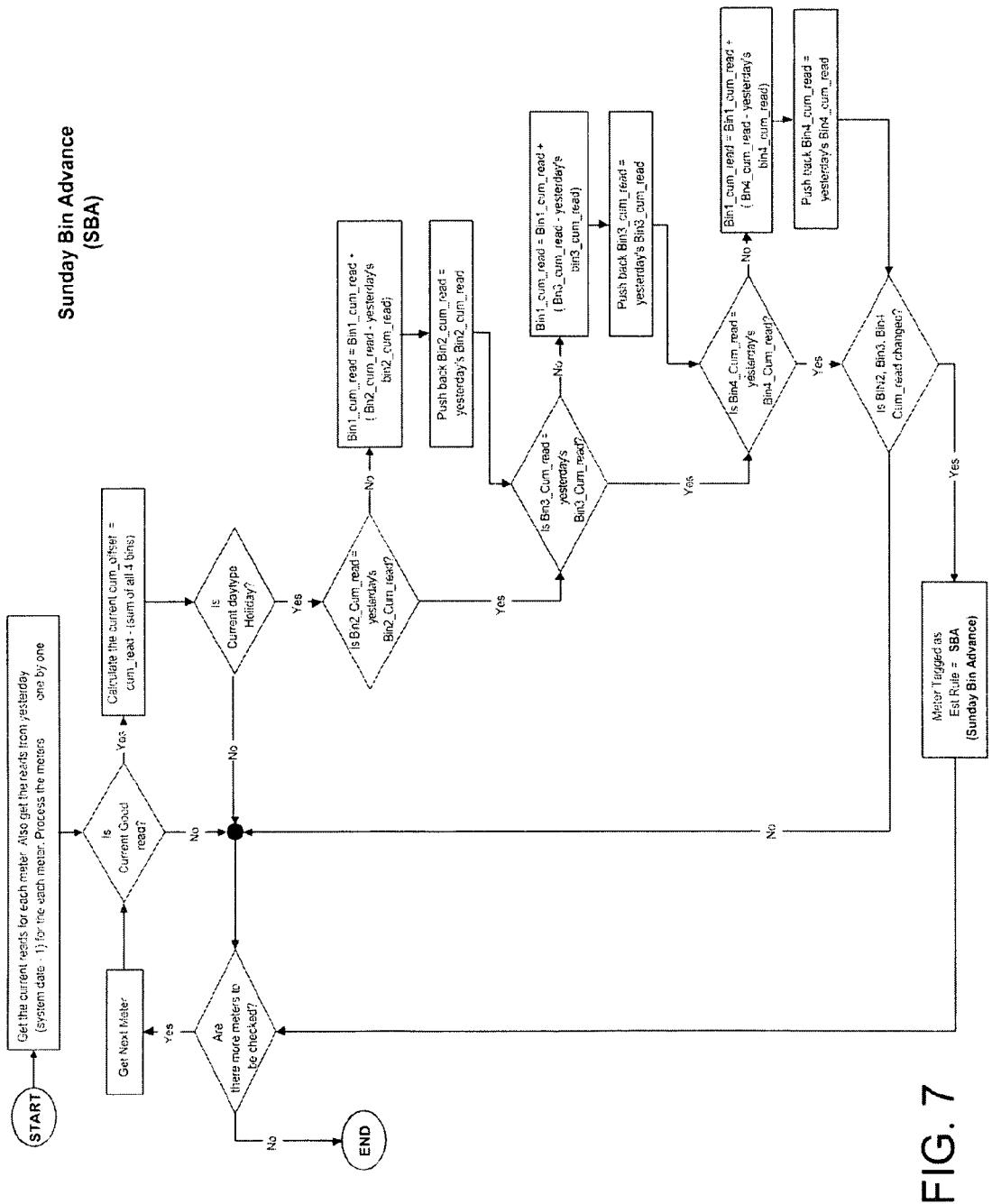
FIG. 7 illustrates in flow chart form a presently preferred embodiment of the present invention. The figure depicts the steps involved in applying one of the rules of the present invention related to tagging meter read data as Demand Read Missing.

Referring to FIG. 7, an illustration in flowchart of a preferred embodiment of the present invention is presented. The flowchart depicts the steps of getting the current demand reads (daily peak demand, billing cycle peak demand and the demand peaks for each of the bins) for each meter along with the previous day's reads for each meter (step 550). As each meter is processed on-by-one, a determination is made as to whether the current read is incomplete or partial or stale or missing. If the CUM read is complete, partial or stale or missing, the current demand reads are tagged as a Demand Read Missing (DRM) (step 580). A determination is made to check if any more meters are to be processed (step 585) and if Yes then the next meter in the list is processed using the same process as above (step 625).

In the example below, cumulative reads were provided by the AMR vendor but their process failed to read and provide the Demand registers. The current invention flags the demand reads as missing if any AMR vendor fails to deliver all demand reads.

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 |
|---|---|---|---|---|---|---|---|---|
| Jan. 19, 2002 | 0.511 | 0.504 | 0.468 | 0.525 | 0.561 | 0.547 | 0.504 | 0.54 |
| Jan. 20, 2002 | 0.511 | 0.475 | 0.475 | 0.496 | 0.633 | 0.547 | 0.504 | 0.54 |
| Jan. 21, 2002 | 0.633 | 0 | 0 | 0 | 0.633 | 0.547 | 0.504 | 0.54 |
| Jan. 22, 2002 | 0.504 | 0.489 | 0.367 | 0.511 | 0.633 | 0.547 | 0.504 | 0.54 |
| Jan. 23, 2002 | 0.475 | 0.518 | 0.424 | 0.511 | 0.633 | 0.547 | 0.504 | 0.54 |

Demand Reads as Delivered by AMR vendor

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 | Tag |
|---|---|---|---|---|---|---|---|---|---|
| Jan. 19, 2002 | .511 | .504 | .468 | .525 | .561 | .547 | .504 | .54 | |
| Jan. 20, 2002 | .511 | .475 | .475 | .496 | .561 | .547 | .54 | .54 | IPD |
| Jan. 21, 2002 | .633 | 0 | 0 | 0 | .633 | .547 | .54 | .54 | DRM |
| Jan. 22, 2002 | .504 | .489 | .367 | .511 | .633 | .547 | .54 | .54 | |
| Jan. 23, 2002 | .475 | .518 | .424 | .511 | .633 | .547 | .54 | .54 | |

Demand readings after being processed by the current invention

This rule verifies the reset of the bill-cycle demand. If the demand is not reset, the demand read is tagged as DNR. This process is checked for three successive days in order to accommodate reset retries by the AMR vendor's process.

Referring to FIG. 7, an illustration in flowchart of a preferred embodiment of the present invention is presented. The flowchart depicts the steps of getting the current demand reads (daily peak demand, billing cycle peak demand and the demand peaks for each of the bins) for each meter along with the previous day's reads for each meter (step 550). As each meter is processed on-by-one, a determination is made as to whether the current read is incomplete or partial or stale or missing (step 555). If the read is determined to be a good read then another determination is made to check if the meter was billed previous day (step 560). If previous day was the bill day for the meter (the demand should have been reset to a zero value), a determination is made to check if the billing peak demand as reported by the meter reads is equal to previous day's billing peak demand (step 565). In an ideal scenario the billing peak demand as reported by the meter reads should not be equal to previous day's billing peak demand. If Yes, then a determination is made to check if the billing peak demand reported today is NOT equal to the maximum value of the various daily peak demands in the various bins for the meter (since this is the next day after reset, the max daily peak demand should be equal to the billing peak demand) (step 570). If yes, the reads are tagged as Demand Not Reset (DNR) (step 575). A determination is made to check if any more meters are to be processed (step 585) and if Yes then the next meter in the list is processed using the same process as above (step 625).

An example of such a DNT read is shown below.

Referring to FIG. 7, an illustration in flowchart of a preferred embodiment of the present invention is presented. The flowchart depicts the steps of getting the current demand reads (daily peak demand, billing cycle peak demand and the demand peaks for each of the bins) for each meter along with the previous day's reads for each meter (step 550). As each meter is processed on-by-one, a determination is made as to whether the current read is incomplete or partial or stale or

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 | Bin 1 TIME | Bin 2 TIME | Bin 3 TIME | Bin 4 TIME |
|---|---|---|---|---|---|---|---|---|---|---|---|---|
| Dec. 30, 2001 4:29:59 PM | 4.224 | 0 | 0 | 0 | 4.302 | 2.039 | 4.406 | 4.363 | Dec. 30, 2001 4:29:59 PM | Jan. 1, 1970 4:41:28 PM | Jan. 1, 1970 4:41:28 PM | Jan. 1, 1970 4:41:28 PM |
| Dec. 31, 2001 2:44:59 AM | 3.818 | 1.658 | 3.905 | 3.896 | 4.302 | 2.039 | 4.406 | 4.363 | Dec. 31, 2001 2:44:59 AM | Dec. 31, 2001 6:14:59 AM | Dec. 31, 2001 4:29:59 PM | Dec. 31, 2001 5:29:59 PM |
| | | | | | Normal Demand Reset Date for Bill Cycle | | | | | | | |
| Jan. 1, 2002 12:44:59 AM | 0 | 0 | 0 | 0 | 4.302 | 2.039 | 4.406 | 84.363 | | | | |
| | | | | | Reset Took Place One day later | | | | | | | |
| Jan. 2, 2002 9:44:59 PM | 3.974 | 1.762 | 4.25 | 4.224 | 3.974 | 1.762 | 4.25 | 4.224 | Jan. 2, 2002 9:44:59 PM | Jan. 2, 2002 6:14:59 AM | Jan. 2, 2002 4:29:59 PM | Jan. 2, 2002 5:14:59 PM |
| Jan. 3, 2002 2:29:59 AM | 3.827 | 1.71 | 4.311 | 4.224 | 3.974 | 1.762 | 4.311 | 4.224 | Jan. 3, 2002 2:29:59 AM | Jan. 3, 2002 6:14:59 AM | Jan. 3, 2002 4:29:59 PM | Jan. 3, 2002 5:14:59 PM |

Demand Reads as Delivered By any AMR vendor

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 | TAG |
|---|---|---|---|---|---|---|---|---|---|
| Dec. 30, 2001 4:29:59 PM | 4.224 | 0 | 0 | 0 | 4.302 | 2.039 | 4.406 | 4.363 | |
| Dec. 31, 2001 2:44:59 AM | 3.818 | 1.658 | 3.905 | 3.896 | 4.302 | 2.039 | 4.406 | 4.363 | |
| Jan. 1, 2002 12:44:59 AM | | | | | 4.302 | 2.039 | 4.406 | 4.363 | DNR |
| Jan. 2, 2002 9:44:59 PM | 3.974 | 1.762 | 4.25 | 4.224 | 3.974 | 1.762 | 4.25 | 4.224 | |
| Jan. 3, 2002 2:29:59 AM | 3.827 | 1.71 | 4.311 | 4.224 | 3.974 | 1.762 | 4.311 | 4.224 | |

Demand readings after being processed by the current invention

The daily peak value is the demand value established for a 24-hour period of time which can be independently measured or in case of a TOU meter on demand, the maximum demand value from among the various bin values would be depicted as the daily peak value. A good daily peak value is one where the read is greater than the value from the previous day's read and is equal to one of the demand values from the various TOU bins. This would mean that a new demand was established today and this value would now be reflected in the bill-cycle peak value. In the case where a new demand was not established today and the maximum demand was lower than previous day, the bill-cycle peak value would be retained.

By definition, a new peak is established when the daily demand exceeds all previous demands for the current bill cycle. If a new bill-cycle peak demand was reported yet the daily peak was of a lower value, the bill-cycle peak demand is suspect, likewise, if the daily demand exceeds the bill-cycle demand, an understatement of the bill-cycle demand has occurred. If either one of these events takes place, the demand reading is tagged as Incorrect Peak Demand.

missing (step 555). If the read is determined to be a good read then another determination is made to check if the meter was billed previous day (step 560). If yes, then a determination is made to check if the current day's billing peak demand is equal to previous day's billing peak demand (step 590). If yes, (no new peak was established), then another determination is made to check if the billing peak demand is lower is value than any of the daily peak demand in any of the bins (step 595). If yes, then a new peak was established in that bin but was not reflected in the billing peak demand and hence the read is tagged as an Incorrect Peak Demand (step 610). If the current day billing peak demand is not equal to previous day's billing peak demand then a determination is made as to whether current peak demand is lower than previous day's billing peak demand (step 600.) If current billing peak demand equals current day daily peak demand (step 605) then a determination is made as to whether current daily peak demand is less than previous day's billing peak demand (step 615) meter is tagged as IPD (Incorrect Peak Demand.)

An example of such an IPD read is shown below.

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 |
|---|---|---|---|---|---|---|---|---|
| Jan. 19, 2002 | 0.511 | 0.504 | 0.468 | 0.525 | 0.561 | 0.547 | 0.504 | 0.54 |
| Jan. 20, 2002 | 0.511 | 0.475 | 0.475 | 0.496 | 0.633 | 0.547 | 0.504 | 0.54 |
| Jan. 21, 2002 | 0.633 | 0 | 0 | 0 | 0.633 | 0.547 | 0.504 | 0.54 |
| Jan. 22, 2002 | 0.504 | 0.489 | 0.367 | 0.511 | 0.633 | 0.547 | 0.504 | 0.54 |
| Jan. 23, 2002 | 0.475 | 0.518 | 0.424 | 0.511 | 0.633 | 0.547 | 0.504 | 0.54 |

Demand Reads as Delivered by an AMR vendor

| Date | Daily Demand Bin 1 | Daily Demand Bin 2 | Daily Demand Bin 3 | Daily Demand Bin 4 | Bill-Cycle Demand Bin 1 | Bill-Cycle Demand Bin 2 | Bill-Cycle Demand Bin 3 | Bill-Cycle Demand Bin 4 | Tag |
|---|---|---|---|---|---|---|---|---|---|
| Jan. 19, 2002 | .511 | .504 | .468 | .525 | .561 | .547 | .504 | .54 | |
| Jan. 20, 2002 | .511 | .475 | .475 | .496 | .561 | .547 | .54 | .54 | IPD |
| Jan. 21, 2002 | .633 | 0 | 0 | 0 | .633 | .547 | .54 | .54 | DRM |
| Jan. 22, 2002 | .504 | .489 | .367 | .511 | .633 | .547 | .54 | .54 | |
| Jan. 23, 2002 | .475 | .518 | .424 | .511 | .633 | .547 | .54 | .54 | |

Demand readings after being processed by the current invention

Figure 8:
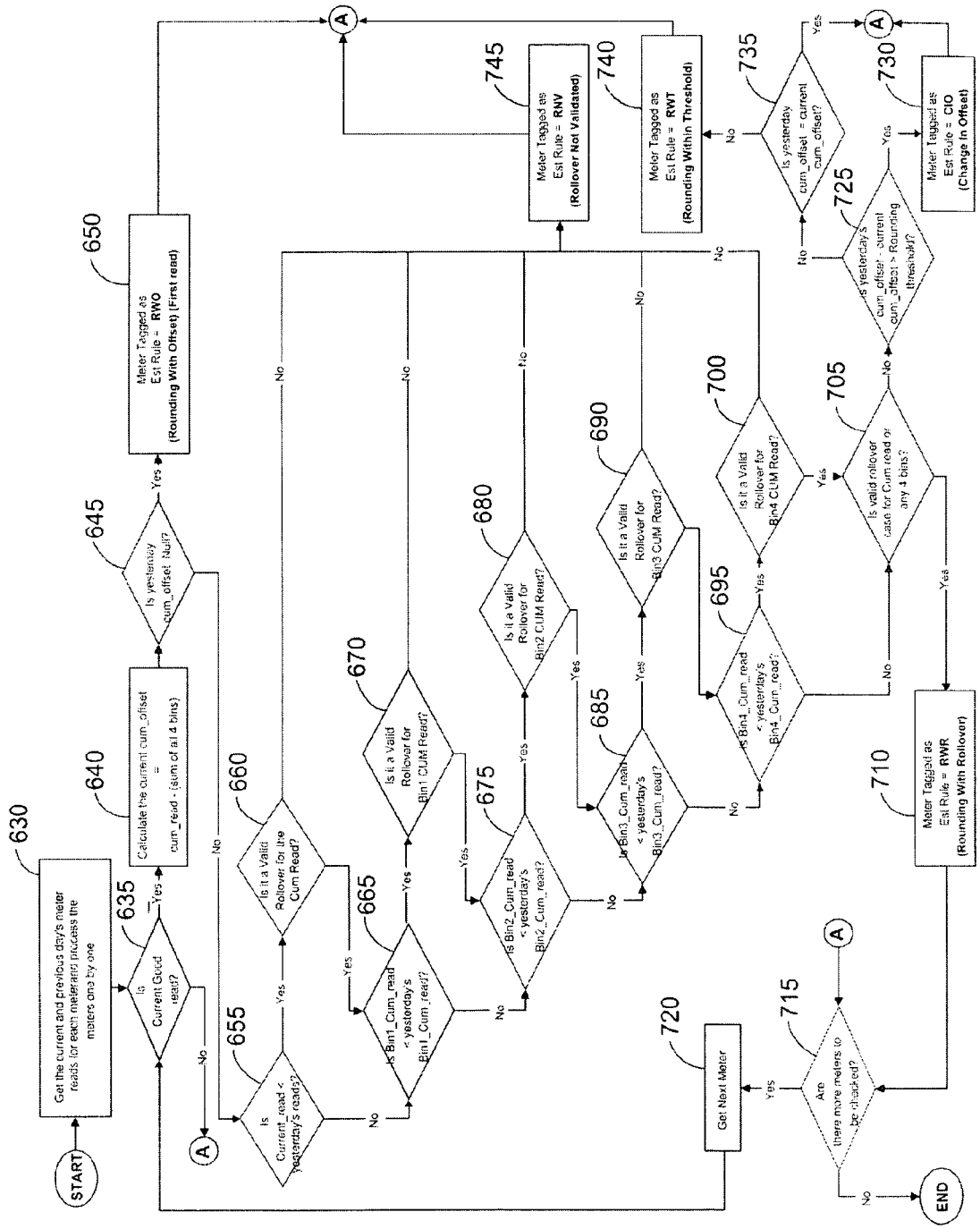
FIG. 8 illustrates in flow chart form a presently preferred embodiment of the present invention. The figure depicts the steps involved in applying one of the rules of the present invention related to tagging meter read data as Rounding with Offset.

Referring to FIG. 8, an illustration in flowchart of a presently preferred embodiment of the present invention is presented. Utilities traditionally do not bill its customers for fractional energy usage. Cumulative consumption reads provided to billing are always rounded down to an integer value. Applying this same logic to TOU readings results in an understating of the Bin values by up to 4 units (if there are only four time of use bins). This understatement of consumptions is termed "Truncation" or "Rounding." FIG. 8 depicts the steps of getting the current reads for each meter along with the previous day's reads for each meter (step 635.) As each meter is processed one-by-one, a determination is made as to whether the current read is good and if it is the first read for the meter (step 640.) If yes, the current cumulative offset is calculated, which is equal to the difference of cumulative read and sum of all four bins (step 645)? If the previous day's cumulative offset is null (step 650) then the meter is tagged as Rounding with Offset (RWO) (step 655)

In an AMR system, most meters start as a Cumulative consumption meter before being converted to TOU. Since the four TOU registers start at zero and are "turned On" at a later date, the consumption represented by the sum of the TOU registers differs from the value of the cumulative consumption register by a fixed amount. This fixed amount is known as the "offset" value. The "offset" value should remain constant over time except when one or more registers rolls over. The offset value is used for detecting meter hardware and software errors. In the example below the readings for a meter that was 'turned ON' after being a CUM only meter. An initial offset value needs to be established on the first day of the TOU read. The AMR CUM read may have required nominal adjustment to account for rounding. The following tables are examples of the offset creation process.

| Read time | CUM | BIN 1 | BIN 2 | BIN 3 | BIN 4 |
|---|---|---|---|---|---|
| Feb. 10, 2002 11:59:59 PM | 28429 | 00012 | 00019 | 00007 | 00008 |

Original Data as provided by an AMR vendor

| Read time | CUM | BIN 1 | BIN 2 | BIN 3 | BIN 4 | TAG | Offset | Notes |
|---|---|---|---|---|---|---|---|---|
| Feb. 10, 2002 11:59:59 PM | 28429 | 00012 | 00019 | 00007 | 00008 | RWO | 28383 | First TOU read Offset Created |

Readings after being processed by the current invention

If the previous day's cumulative offset is not null then a determination is made as to whether the current read is less than previous day's reads (step 660.) If yes, then the next step 665 involves a determination as to whether it is a valid rollover for the cumulative read. If yes, a determination is made as to whether bin 1 cumulative read is less than the previous day's bin 1 cumulative read (step 670). If yes, and if it is a valid rollover for the Bin 1 cumulative read (step 675) then a determination is made as to whether bin 2 cumulative read is less than the previous day's bin 2 cumulative read (step 680).

If yes, and if it is a valid rollover for bin 2 cumulative read (step 685) then a determination is made as to whether bin 3 cumulative read is less than the previous day's bin 3 cumulative read (step 690.) If yes, a determination is made as to whether it is a valid rollover for bin 3 cumulative read (step 695.) If yes, a determination is made as to whether bin 4 cumulative read is less than the previous day's bin 4 cumulative read (step 700.) If yes, and if it is a valid rollover for bin 4 cumulative read (step 705) and if it is a valid rollover case for cumulative read or any four bins (step 710) then the meter is tagged as Rounding With Rollover (RWR.) (step 715.) If bin 4 cumulative read is greater than or equal to the previous day's bin 4 cumulative read and if it is a valid rollover case for cumulative read or any of the four bins then the meter is tagged as Rounding With Rollover (RWR) (step 715). If there are more meters to be checked (step 720) then the aforementioned steps are repeated with the next meter (step 725.)

If the previous day's cumulative offset minus current cumulative offset is less than rounding threshold (step 730) then the meter is tagged as Change in Offset (CIO.) (step 735). If the previous day's cumulative offset minus current cumulative offset is greater than or equal to the rounding threshold and if the previous day's cumulative offset is not equal to current cumulative offset (step 740) then the meter is tagged as Rounding Within Threshold (RWT) (step 745.) Most cases of rounding involve adjusting the CUM value up or down so that the sum of the usages in the TOU bins equal the usage in the CUM value. In the example below the AMR CUM read required nominal adjustment to of the Cumulative Consumption account for rounding of the TOU Bins. When the amount of CUM value to be adjusted is within the threshold (4 KWH if there are four (4) TOU Bins) then the read is tagged as a RWT.

| Read time | CUM | BIN 1 | BIN 2 | BIN 3 | BIN 4 |
|---|---|---|---|---|---|
| Jan. 8, 2002:23:59:59 | 99697 | 16896 | 5589 | 9253 | 5963 |
| Jan. 9, 2002:23:59:59 | 99891 | 16946 | 5635 | 9316 | 5998 |

Original Data as provided by an AMR vendor

| Read time | CUM | BIN 1 | BIN 2 | BIN 3 | BIN 4 | TAG | Offset | Notes |
|---|---|---|---|---|---|---|---|---|
| Jan. 8, 2002:23:59:59 | 99696 | 16896 | 5589 | 9253 | 5963 | RWT | 61995 | Rounding within Threshold CUM Adjusted |
| Jan. 9, 2002:23:59:59 | 99890 | 16946 | 5635 | 9316 | 5998 | RWT | 61995 | Rounding within Threshold CUM Adjusted |

Readings after being processed by the current invention

If neither or none of the bin reads are a valid rollover then the meter is tagged as Rollover Not Validated (RNV) (step 750.) Anytime the CUM value or Bin value decrements from the previous day, a test for rollover must be made. The test as displayed in the below example is specific for each utility and in one implementation of the current invention is made by determining historical energy usage and comparing that usage with calculated usage for the current day assuming a rollover. If the current usage is less than 20 times the historical usage, a rollover is assumed. Historical energy is evaluated by calculating a single day's usage either 7, 8 or 14 days previously (configurable parameters). If this historical usage can not be determined and a rollover may have taken place, the current reads are tagged RNV.

If the following example, it can be seen that the current reading (day 0) is less than the previous day's read (day 1). To determine if a rollover exists, the current daily usage is calculated assuming a rollover, in this case the usage is 3 units of energy (100002-99999). This daily usage is compared to twenty times the usage seven days prior that was 20 units (20×1). Since 3 units is less than 20 units, rollover is assumed to have taken place.

| Day | Reading | Usage | Comment |
|---|---|---|---|
| 15 | 99981 | — | |
| 14 | 99982 | 1 | Normal Usage |
| 13 | 99983 | 1 | Normal |
| 12 | 99985 | 2 | Normal |
| 11 | 99986 | 1 | Normal |
| 10 | 99987 | 1 | Normal |
| 9 | 99988 | 1 | Normal |
| 8 | 99989 | 1 | Normal |
| 7 | 99990 | 1 | Normal |
| 6 | 99991 | 1 | Normal |
| 5 | 99992 | 1 | Normal |
| 4 | 99994 | 2 | Normal |
| 3 | 99996 | 2 | Normal |
| 2 | 99998 | 2 | Normal |
| 1 | 99999 | 1 | Normal |
| 0 | 00002 | ??? | Did a rollover take place? |

If the rounding was identified and can be validated by the same algorithm above, and determined that a true rollover occurred, the reading is tagged as a RWR the AMR read may have required nominal adjustment to account for rounding but because of a register rollover, a new offset value was established. The following tables are examples of the offset adjustment process due to rollover.

| Read time | CUM | BIN 1 | BIN 2 | BIN 3 | BIN 4 |
|---|---|---|---|---|---|
| Feb. 10, 2002 11:59:59 PM | 99892 | 16946 | 5635 | 9316 | 5998 |

-continued

| Read time | CUM | BIN 1 | BIN 2 | BIN 3 | BIN 4 |
|---|---|---|---|---|---|
| Feb. 11, 2002 11:09:56 PM | 92 | 17010 | 5670 | 9372 | 6044 |

Original Data as provided by an AMR vendor

| Read time | CUM | BIN 1 | BIN 2 | BIN 3 | BIN 4 | TAG | Offset | Notes |
|---|---|---|---|---|---|---|---|---|
| Feb. 10, 2002 11:59:59 PM | 99891 | 16946 | 5635 | 9316 | 5998 | RWT | 61996 | Read Within Threshold |
| Feb. 11, 2002 11:09:56 PM | 92 | 17010 | 5670 | 9372 | 6044 | RWR | −38004 | Rounding With Rollover New Offset Created |

Readings after being processed by the current invention

Generally an electric meter is initialized as a Cumulative consumption only meter and after a period of time is reconfigured as a Time-of-Use meter. The energy consumption registered by the meter just prior to enabling TOU is stored in the Meter Data Warehouse (MDW) as a TOU offset value. The value is defined mathematically as:

Offset=*CUM* Register Value−Sum of the *TOU* Bins

The offset should stay constant +/−4 over time (The +/−4 accounts for rounding of the KWH values in each of the four (4) bins). Changes in this offset are the result of:

Normal bin or register rollovers
Register resets
Bin resets

When the difference in consumption values for two successive reads does not agree with the difference in TOU Bin values, a new offset is calculated. A determination is made by the VAEE process to determine the cause for the offset change. If the cause is due to a reset, some sort of billing adjustment is probably necessary in the near future and the discrepancy is flagged in MDW as CIO (Change in offset).

The following table shows a partial set of reads as delivered by an AMR vendor to a utility that is then stored in a meter data warehouse. At first glance, all the bins and CUM values appear to be incrementing normally.

| Read time | CUM | BIN 1 | BIN 2 | BIN 3 | BIN 4 |
|---|---|---|---|---|---|
| Feb. 10, 2002 11:59:59 PM | 28429 | 5569 | 2805 | 4311 | 3168 |
| Feb. 11, 2002 11:09:56 PM | 28491 | 5576 | 2814 | 4337 | 3188 |
| Feb. 12, 2002 9:20:43 PM | 28528 | 5580 | 2819 | 4343 | 3188 |

TOU and CUM Reads as Delivered By any AMR vendor

Upon receipt of the first set of TOU reads, the current process calculates and stores the initial offset value. An offset value is calculated for each subsequent read and compared to the initial offset value. Differences in offset of up to 4 are allowed to handle truncation and rollover scenarios. If the offset changes by more than 4, either a reset or rollover has taken place.

The following table shows that a new offset resulted on Feb. 12, 2002. This offset was the result of the CUM register advancing by 22 KWH than the bins.

| Read time | CUM | BIN 1 | BIN 2 | BIN 3 | BIN 4 | TAG | Offset | Notes |
|---|---|---|---|---|---|---|---|---|
| Feb. 10, 2002 11:59:59 PM | 28429 | 5569 | 2805 | 4311 | 3168 | RWO | 12576 | Offset Created |
| Feb. 11, 2002 11:09:56 PM | 28491 | 5576 | 2814 | 4337 | 3188 | RWT | 12576 | Rounding within Threshold |
| Feb. 12, 2002 9:20:43 PM | 28528 | 5580 | 2819 | 4343 | 3188 | CIO | 12598 | Bins increased by 15 while CUM Register Changed by 37 |

Allocation and estimation takes place to fill in missing data. The estimation is made the day the missing data is first identified and then adjusted once a good read is provided later by the AMR vendor. If the estimate is used for billing, it is flagged so that it is not adjusted when a good read later becomes available. This is to prevent disagreement between the data available for customer presentment and date used for billing. These rules can vary from utility to utility and hence the current invention's architecture involves using lookup tables and parameters to drive the algorithms used for allocation and estimation. This very generic and flexible architecture is one of the main features of this invention. For the sake of explanation a preferred embodiment of the present invention's general estimating rules is presented below:

Allocations and estimates are based on a similar day's usage history
  1. Use last week's read if last week's read is available and has no error flags associated with it.
  2. One-week-old read must be of the same day type. A holiday cannot be used to allocate/estimate a non-holiday.
  3. Use two week old read if two-week-old read is available and has no error flags associated with it.
  4. Two-week-old read must be of the same day type. A holiday cannot be used to allocate/estimate a non-holiday.
  5. Use eight day old read if eight-day-old read is available and has no error flags associated with it.
  6. Eight-day-old read must be of the same day type. A holiday cannot be used to allocate/estimate a non-holiday.
  7. Use a Sunday read to allocate/estimate a holiday read.
Do not estimate demand reads
Do not estimate more than seven days in a row.

This refers to a situation where the data for calculating the allocation values is not present and the algorithm has exhausted all avenues of estimating the value. In such a situation the read is tagged as NHD since no historical data was present to help in the calculation of the estimate.

Figure 9:
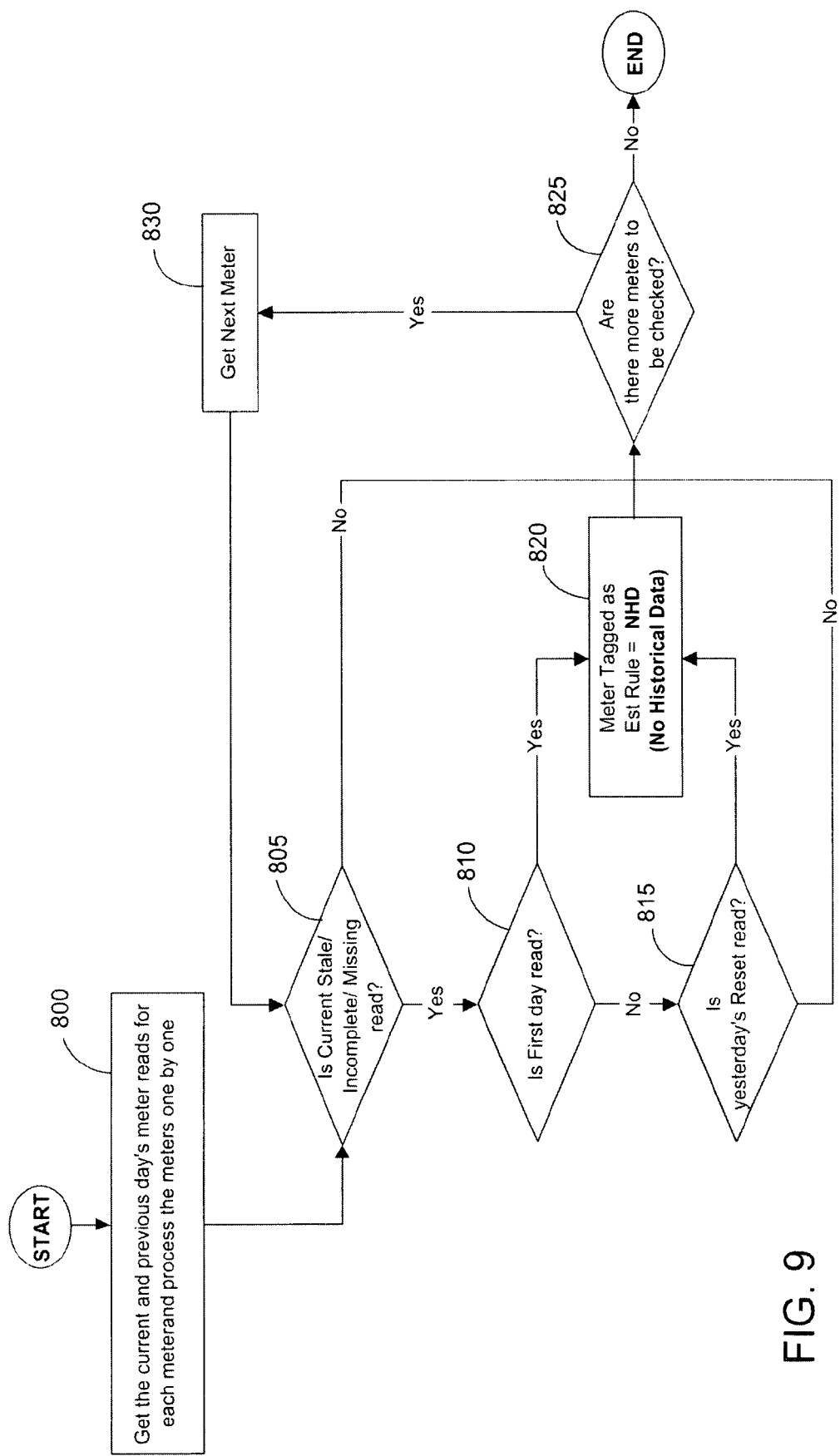
FIG. 9 illustrates in flow chart form a presently preferred embodiment of the present invention. The figure depicts the steps involved in applying one of the rules of the present invention related to tagging meter read data as No Historical Data Found.

Referring to FIG. 9, an illustration in flowchart of a preferred embodiment of the present invention is presented. The flowchart depicts the steps of getting the current meter reads for each meter along with the previous day's reads for each meter (step 800). As each meter is processed on-by-one, a determination is made as to whether the current read is a stale, incomplete or missing read (step 805). If no, then the next meter is selected for analysis. If yes, then the process has to estimate the read because that is one of its core functionalities. In order to correctly estimate a read, the process requires a previous read to estimate based on the meter/customer's usage pattern. A determination is made to check if this is the first day's read for the meter (step 810). If it is determined to be the first day's read, then the read is tagged as a No historical data found (NHD) step 820. Since the estimate has to be added to previous day's cum read, a determination is made to check the status of the read previous day and verify that is was not a Reset read (step 815). If it was a rest read previous day, a good estimate cannot be added to a suspect read and hence the read is tagged as a No historical data found (NHD) step 820. A determination is made to check if any more meter are to be processed (step 825) and if Yes then the next meter in the list is processed using the same process as above (step 830).

In the example below an allocation/estimation could not be made since the historical data was not available or did not meet strict rules to allow it to be used for estimating purposes.

the seventh day would have been tagged as an ETO. Replacement of the meter is not necessary, but a Virtual Meter Exchange of the meter on UBS could correct the reads for customer billing. The ETO read would need to be supplied to the UBS with an adjusted set of stop and start reads. A limitation on the number of estimates is imposed on both stale reads and good reads. In the second scenario, the meter has reported a good read after many days of stale and partial reads and a threshold prevents it from re-adjusting all the estimated reads in between. Is such a scenario we tag the current Good read with an ETO for estimation threshold overflow.

Figure 10:
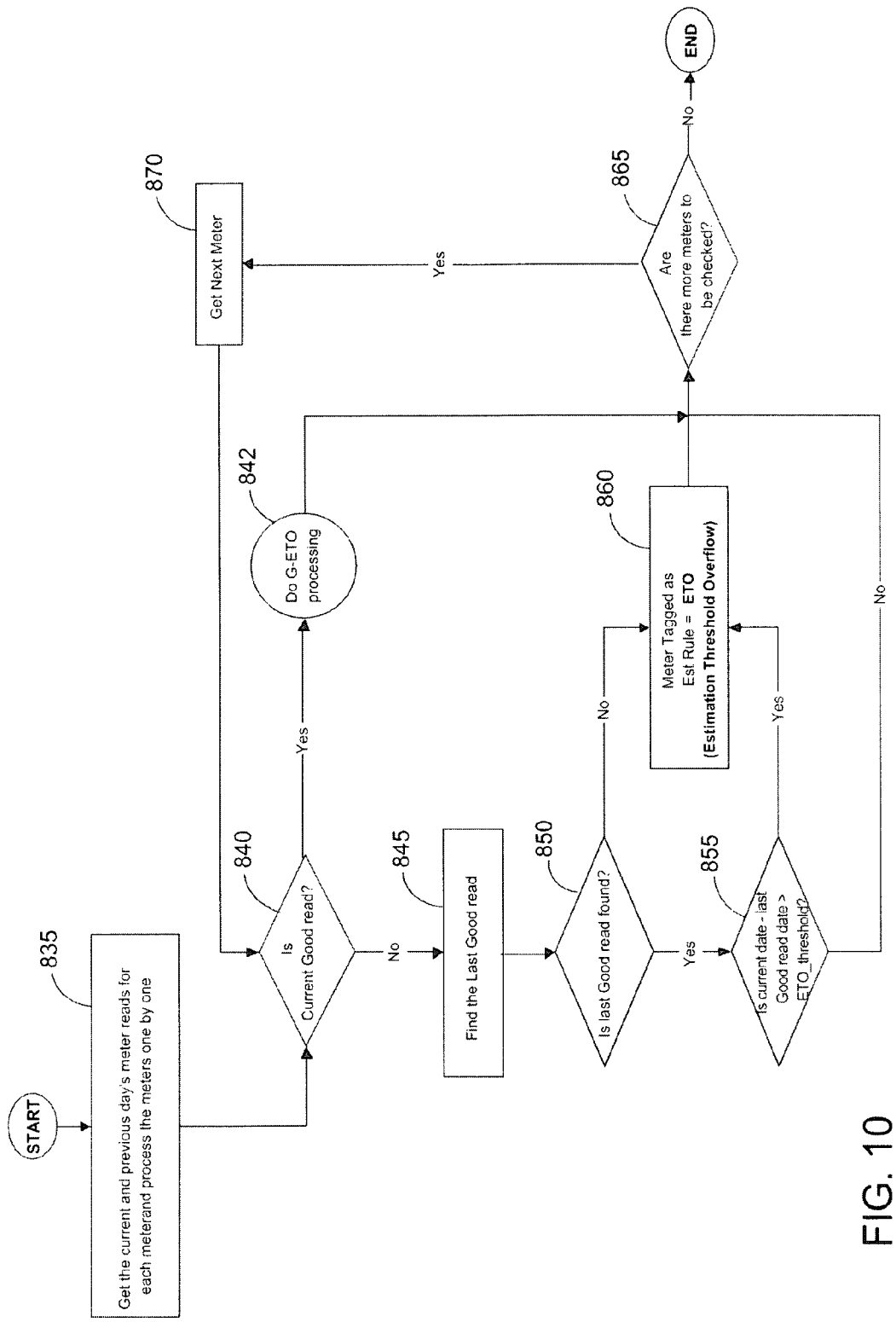
FIG. 10 illustrates in flow chart form a presently preferred embodiment of the present invention. The figure depicts the steps involved in applying one of the rules of the present invention related to tagging meter read data as Estimation Threshold Overflow.

Referring to FIG. 10, an illustration in flowchart of a preferred embodiment of the present invention is presented. The flowchart depicts the steps of getting the current meter reads for each meter along with the previous day's reads for each meter (step 835). As each meter is processed on-by-one, a determination is made as to whether the current read is a good read (step 840). If yes, then the process rules for a good read that could be tagged as an ETO (842) is executed. If no, then a search is made to get the previous good read (step 845). If a previous good read is not found (very unlikely scenario since it would be tagged as a NHD first before being tagged as an ETO) then the current read is tagged as ETO (step 860). If a previous good read is found and its date is found to be older than the "eto_threshold", the current reads are tagged as an ETO or (Estimation Threshold Overflow). A determination is

| Entry Date | Read Time | CUM | BIN 1 | BIN 2 | BIN 3 | BIN 4 |
|---|---|---|---|---|---|---|
| Dec. 28, 2001 | Dec. 25, 2001 10:26:52 AM | 30158 | 4480 | 1129 | 2646 | 2375 |
| Dec. 29, 2001 | Dec. 25, 2001 10:26:52 AM | 30158 | 4480 | 1129 | 2646 | 2375 |
| Dec. 30, 2001 | Dec. 25, 2001 10:26:52 AM | 30158 | 4480 | 1129 | 2646 | 2375 |
| Dec. 31, 2001 | Dec. 25, 2001 10:26:52 AM | 30158 | 4480 | 1129 | 2646 | 2375 |
| Jan. 1, 2002 | Dec. 25, 2001 10:26:52 AM | 30158 | 4480 | 1129 | 2646 | 2375 |
| Jan. 2, 2002 | Dec. 25, 2001 10:26:52 AM | 30158 | 4480 | 1129 | 2646 | 2375 |
| Jan. 3, 2002 | Dec. 25, 2001 10:26:52 AM | 30158 | 4480 | 1129 | 2646 | 2375 |
| Jan. 4, 2002 | Dec. 25, 2001 10:26:52 AM | 30158 | 4480 | 1129 | 2646 | 2375 |

Original Data as provided by an AMR vendor

| Entry Date | Read Time | CUM | BIN 1 | BIN 2 | BIN 3 | BIN 4 | Tag |
|---|---|---|---|---|---|---|---|
| Dec. 28, 2001 | Dec. 25, 2001 10:26:52 AM | 30158 | 4480 | 1129 | 2646 | 2375 | NHD |
| Dec. 29, 2001 | Dec. 25, 2001 10:26:52 AM | 30158 | 4480 | 1129 | 2646 | 2375 | NHD |
| Dec. 30, 2001 | Dec. 25, 2001 10:26:52 AM | 30158 | 4480 | 1129 | 2646 | 2375 | NHD |
| Dec. 31, 2001 | Dec. 25, 2001 10:26:52 AM | 30158 | 4480 | 1129 | 2646 | 2375 | NHD |
| Jan. 1, 2002 | Dec. 25, 2001 10:26:52 AM | 30158 | 4480 | 1129 | 2646 | 2375 | NHD |
| Jan. 2, 2002 | Dec. 25, 2001 10:26:52 AM | 30158 | 4480 | 1129 | 2646 | 2375 | NHD |
| Jan. 3, 2002 | Dec. 25, 2001 10:26:52 AM | 30158 | 4480 | 1129 | 2646 | 2375 | ETO |
| Jan. 4, 2002 | Dec. 25, 2001 10:26:52 AM | 30158 | 4480 | 1129 | 2646 | 2375 | ETO |

Readings after being processed by the current invention

Estimation Overflow (ETO)

Utilities generally do not continue to estimate forever is a meter read is not available. Stale reads beyond a threshold indicate a problem with the meter and they would like to investigate and if necessary replace the meter in the field. A particular implementation of the current invention uses six consecutive days to estimate and then stops estimation. The next day the reads will be tagged as ETO. In the above example, the meter reported stale (the read time of December 15 was outside the acceptable window) and the process tried to estimate the reads. It was tagged as NHD since no historical reads were available to calculate the estimate. But if they were available, the reads would have been estimated. In both cases made to check if any more meter are to be processed (step 865) and if Yes then the next meter in the list is processed using the same process as above (step 870).

Figure 11:
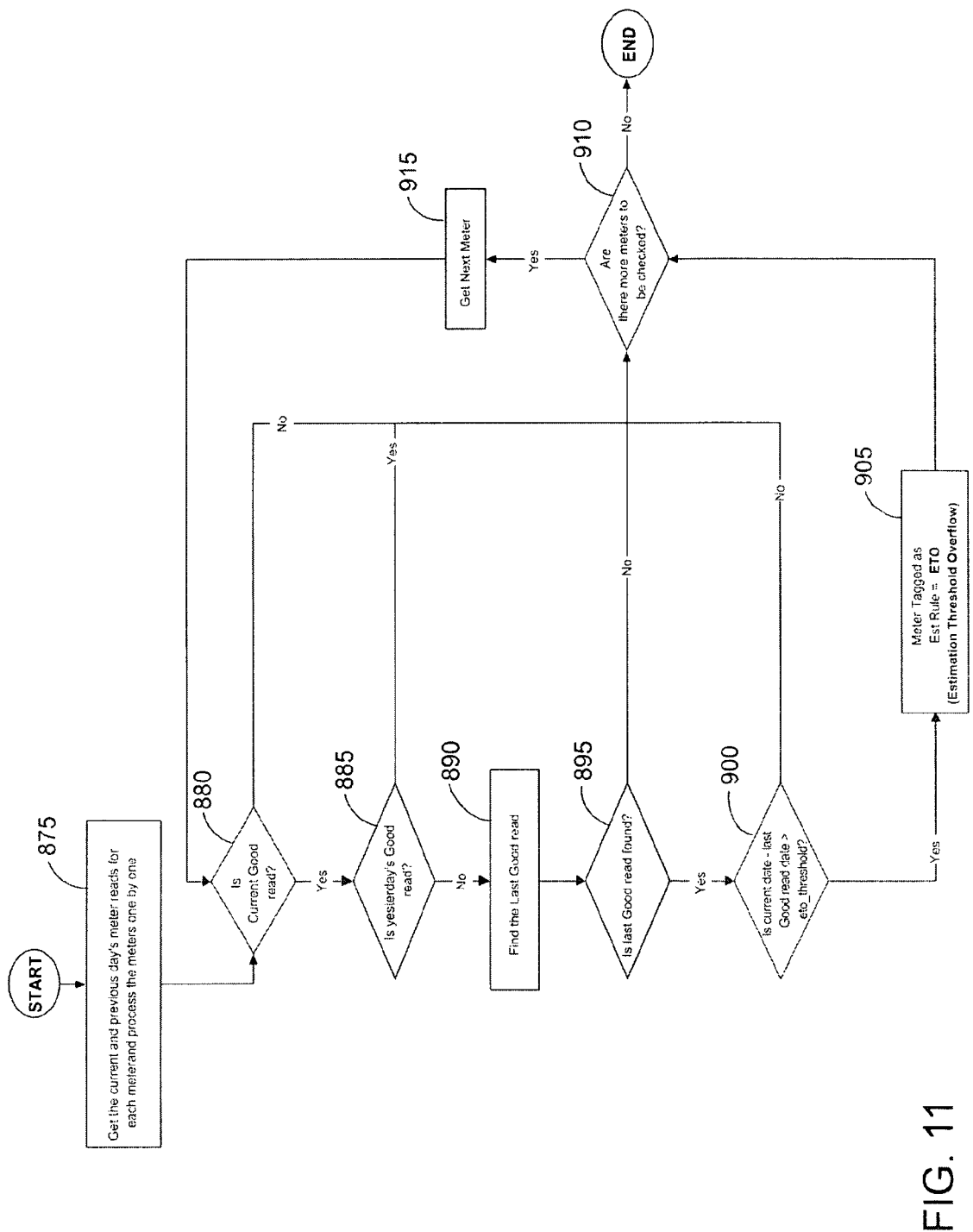
FIG. 11 illustrates in flow chart form a presently preferred embodiment of the present invention. The figure depicts the steps involved in applying one of the rules of the present invention related to tagging meter read data as Estimation Threshold Overflow.

Similarly, referring to FIG. 11, an illustration in flowchart of a preferred embodiment of the present invention is presented. The flowchart depicts the steps of getting the current meter reads for each meter along with the previous day's reads for each meter (step 875). As each meter is processed on-by-one, a determination is made as to whether the current read is a good read (step 880). If yes, then the process rules for a good read that could be tagged as an ETO (842) is executed. If no (step 885), then a search is made to get the previous good read (step 890). If a previous good read is found and its date is found to be older than the "eto_threshold", the current reads are tagged as an ETO or (Estimation Threshold Overflow) (step 905). A determination is made to check if any more meter are to be processed (step 910) and if Yes then the next meter in the list is processed using the same process as above (step 915).

Figure 12:
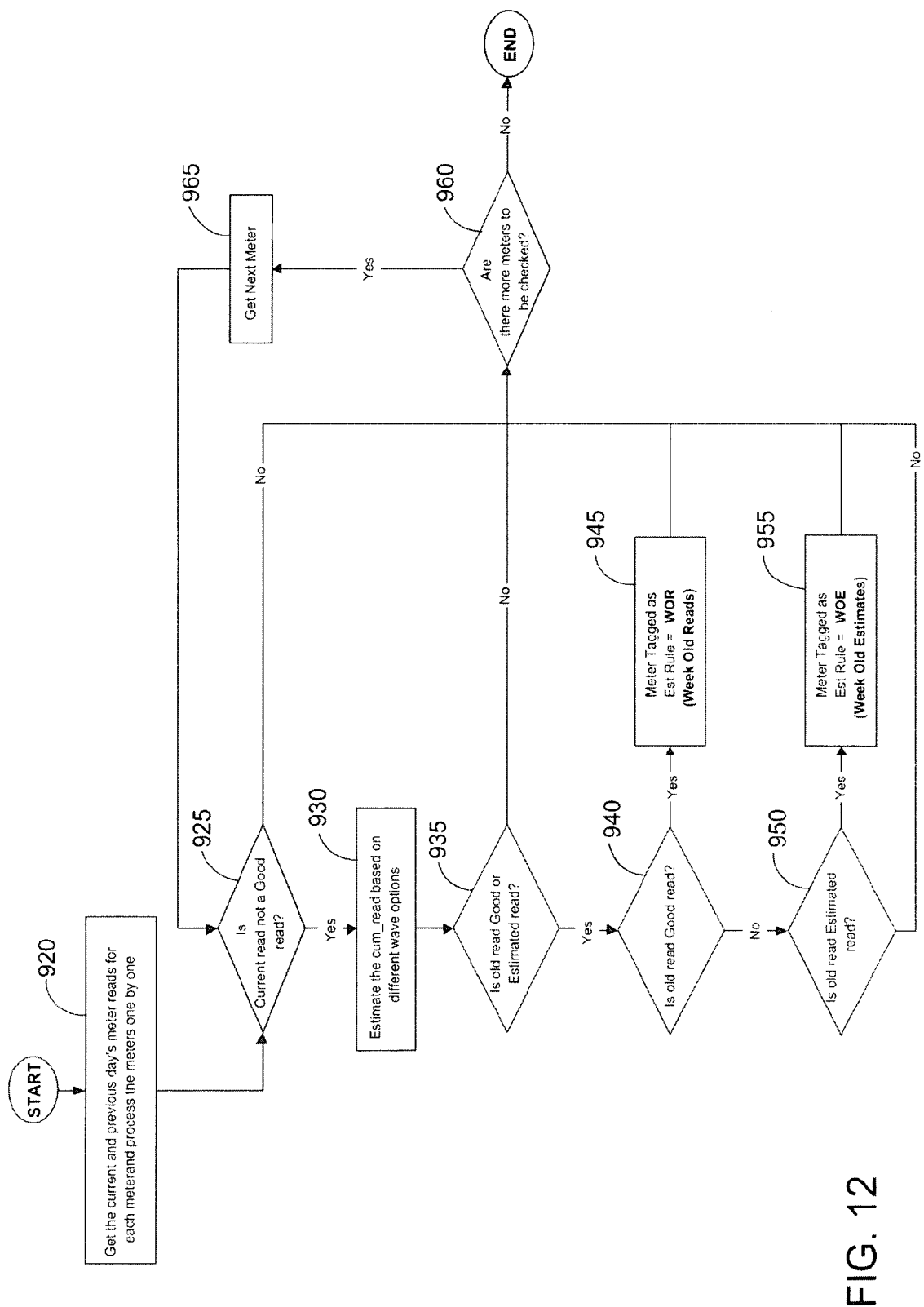
FIG. 12 illustrates in flow chart form a presently preferred embodiment of the present invention. The figure depicts the steps involved in applying one of the rules of the present invention related to tagging meter read data as Week Old Estimates.

Referring to FIG. 12, an illustration in flowchart of a preferred embodiment of the present invention is presented. This flowchart depicts the steps of getting the current meter reads for each meter along with the previous day's reads for each meter (step 920.) If the current read is not a good read (step 925) then estimating the cumulative read based on different wave options in step 930. If the old read is a good read or an estimated read (step 935) and if the old read is a good read (step 940) then the meter is tagged as WOR (Week old Reads 945). This refers to a situation where a week old (same day type) good read was used to calculate the estimate that was then used for editing the stale read. In the example below, no Good read was available on entry date Feb. 25, 2002. Data from seven days ago was used to derive the estimate. The same usage pattern is assumed. The current invention process used the reads with entry dates of February 17 and February 18 to determine the normal consumption pattern for a Sunday (February 24 and February 17). The historical pattern suggested a daily usage of 149 KWH. This historical usage was added the read provided on Feb. 24, 2002 to estimate the Feb. 25, 2002 read. The resulting estimation based on a week old read is 3878 KWH (149+3729). The read was tagged as WOR since both the February 17 and February 18 reads were good end-of-the-day AMR reads and not estimates. Since estimates can also be used to derive futures estimation values.

| Entry Date | Read Time | CUM |
|---|---|---|
| Feb. 17, 2002 | Feb. 16, 2002 11:59:59 PM | 3104 |
| Feb. 18, 2002 | Feb. 17, 2002 11:59:59 PM | 3253 |
| Feb. 19, 2002 | Feb. 18, 2002 11:59:59 PM | 3265 |
| Feb. 20, 2002 | Feb. 19, 2002 10:02:32 PM | 3369 |
| Feb. 21, 2002 | Feb. 19, 2002 10:02:32 PM | 3369 |
| Feb. 22, 2002 | Feb. 21, 2002 7:07:39 PM | 3563 |
| Feb. 23, 2002 | Feb. 21, 2002 7:07:39 PM | 3563 |
| Feb. 24, 2002 | Feb. 23, 2002 8:02:47 AM | 3729 |
| Feb. 25, 2002 | Feb. 23, 2002 8:02:47 AM | 3729 |

Original Data as provided by an AMR vendor

| Entry Date | Read Time | CUM | Tag |
|---|---|---|---|
| Feb. 17, 2002 | Feb. 16, 2002 11:59:59 PM | 3104 | |
| Feb. 18, 2002 | Feb. 17, 2002 11:59:59 PM | 3253 | |
| Feb. 19, 2002 | Feb. 18, 2002 11:59:59 PM | 3265 | |
| Feb. 20, 2002 | Feb. 19, 2002 11:59:59 PM | 3369 | CGR |
| Feb. 21, 2002 | Feb. 20, 2002 11:59:59 PM | 3446 | |
| Feb. 22, 2002 | Feb. 21, 2002 11:59:59 PM | 3563 | CGR |
| Feb. 23, 2002 | Feb. 22, 2002 11:59:59 PM | 3674 | |
| Feb. 24, 2002 | Feb. 23, 2002 11:59:59 PM | 3729 | WOE |
| Feb. 25, 2002 | Feb. 24, 2002 11:59:59 PM | 3878 | WOR |

Readings after being processed by the current invention

However, if the old read is not a good read or estimated read and if there are more meters to be checked (step 960) then the next meter is processed. If the old read is a good read and if the old read is an estimated read then the meter is tagged as WOE (Week Old Estimates.) (step 955.)

This refers to a situation where a week old (same day type) estimate was used to calculate the estimate that was then used for editing the stale read. In the example below, no Good read was available on entry date Feb. 24, 2002. Data from seven days ago (an estimated values as indicated by CGR) was used to derive the estimate. The same usage pattern is assumed. A stale read was received from the AMR system on Feb. 24, 2002 for Feb. 23, 2002 midnight read. The current invention process used the reads with entry dates of February 16 and February 17 to determine the normal consumption pattern for a Saturday (February 23 and February 16). The historical pattern suggested a daily usage of 55 KWH. This historical usage was added the read provided on Feb. 23, 2002 to estimate the Feb. 24, 2002 read. The resulting estimation based on a week old estimate is 3729 KWH (155+3674). The read was tagged as WOE since the Feb. 16 read was tagged as an estimate (CGR).

| Entry Date | Read Time | CUM |
|---|---|---|
| Feb. 16, 2002 | Feb. 11, 2002 4:17:01 AM | 2607 |
| Feb. 17, 2002 | Feb. 16, 2002 11:59:59 PM | 3104 |
| Feb. 18, 2002 | Feb. 17, 2002 11:59:59 PM | 3253 |
| Feb. 19, 2002 | Feb. 18, 2002 11:59:59 PM | 3265 |
| Feb. 20, 2002 | Feb. 19, 2002 10:02:32 PM | 3369 |
| Feb. 21, 2002 | Feb. 19, 2002 10:02:32 PM | 3369 |
| Feb. 22, 2002 | Feb. 21, 2002 7:07:39 PM | 3563 |
| Feb. 23, 2002 | Feb. 21, 2002 7:07:39 PM | 3563 |
| Feb. 24, 2002 | Feb. 22, 2002 8:02:47 AM | 3729 |

Original Data as provided by an ANR vendor

| Entry Date | Read Time | CUM | Tag |
|---|---|---|---|
| Feb. 16, 2002 | Feb. 15, 2002 11:59:59 PM | 3049 | CGR |
| Feb. 17, 2002 | Feb. 16, 2002 11:59:59 PM | 3104 | |
| Feb. 18, 2002 | Feb. 17, 2002 11:59:59 PM | 3253 | |
| Feb. 19, 2002 | Feb. 18, 2002 11:59:59 PM | 3265 | |
| Feb. 20, 2002 | Feb. 19, 2002 11:59:59 PM | 3369 | CGR |
| Feb. 21, 2002 | Feb. 20, 2002 11:59:59 PM | 3446 | |
| Feb. 22, 2002 | Feb. 21, 2002 11:59:59 PM | 3563 | CGR |
| Feb. 23, 2002 | Feb. 22, 2002 11:59:59 PM | 3674 | |
| Feb. 24, 2002 | Feb. 23, 2002 11:59:59 PM | 3729 | WOE |

Readings after being processed by the current invention

Figure 13:
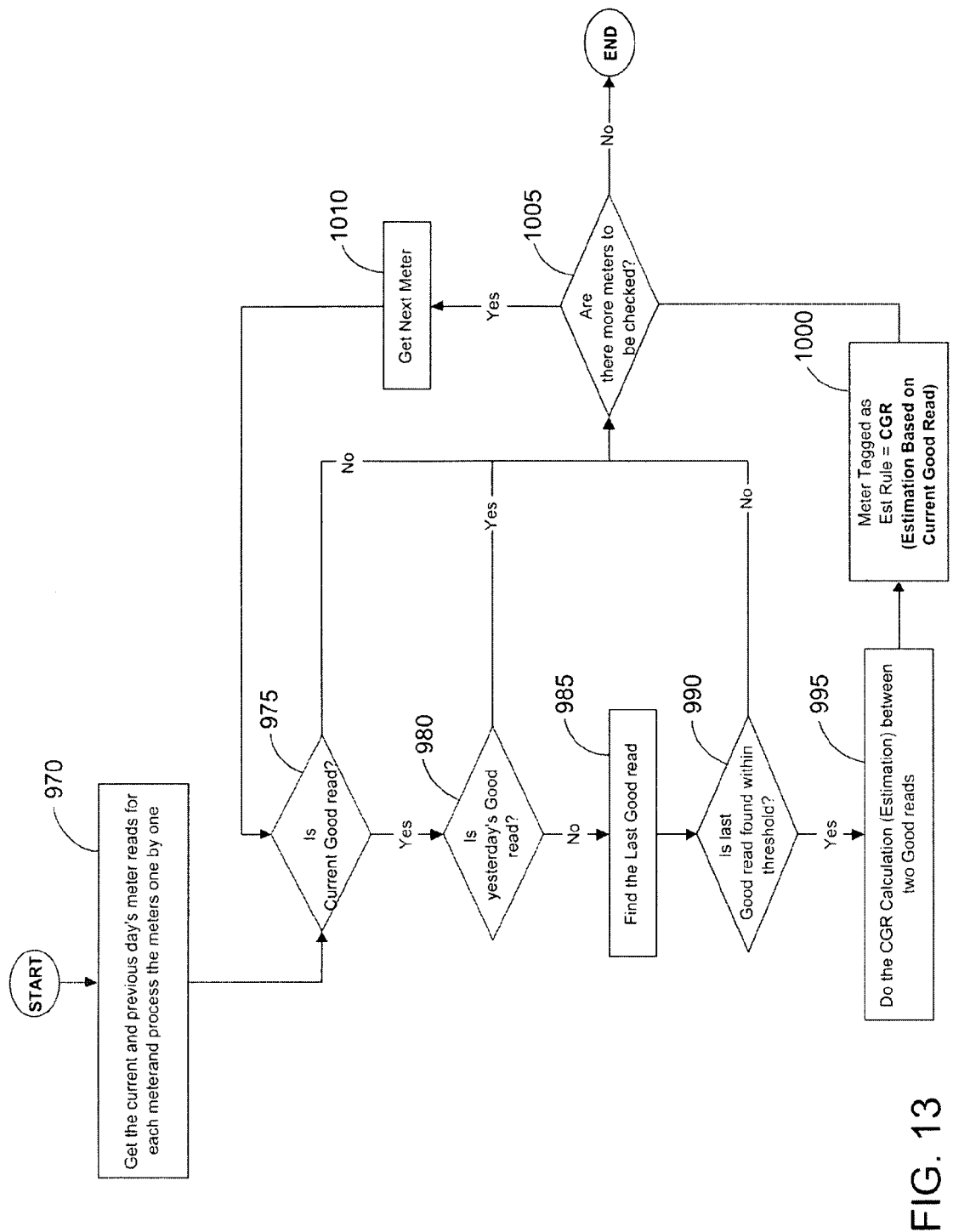
FIG. 13 illustrates in flow chart form a presently preferred embodiment of the present invention. The figure depicts the steps involved in applying one of the rules of the present invention related to tagging meter read data as Estimation based on Current Good Read.

Referring to FIG. 13, an illustration in flowchart of a preferred embodiment of the present invention is presented. This flowchart depicts the steps of getting the current meter reads for each meter along with the previous day's reads for each meter (step 970.) If the current read is good(step 975) and if the previous day's read is not a good read (step 980) then the last good read is ascertained in step 985. If the last good read is found to be within the threshold (step 990) then Current Good Read Calculation id done between two good reads (step 995) and the meter is tagged as CGR (Estimation based on Current Good Read.) (step 1000.)

CGR refers to a situation where a Good read is available today and today's read is then used to re-estimate any estimates done in the past. This ensures that the smoothing is perfect and the customer does not see any artificially created negative consumption by the current process. The estimation process starts with the last good AMR read and uses previous usage patterns to determine the absolute energy usage for each time period to estimate the current CUM and Bin values. The re-estimation process uses a set of actual reads to "bracket" or bound the estimates. The previous usage patterns are then used to allocate the true energy usage over the period of time where no AMR data was available. These new CUM and Bin values based on percent allocation calculations are tagged as "CGR".

It must be emphasized that the CGR process is not an estimation algorithm but rather an allocation algorithm. The total CUM and Bin energy usage is based on actual AMR readings. The exact date of usage is the only parameter being determined by the CGR algorithm.

| Entry Date | Read Time | CUM | BIN 1 | BIN 2 | BIN 3 | BIN 4 |
|---|---|---|---|---|---|---|
| Jan. 17, 2002 | Jan. 16, 2002 11:59:59 PM | 48326 | 9146 | 2380 | 5159 | 3612 |
| Jan. 18, 2002 | Jan. 17, 2002 11:59:59 PM | 48372 | 9162 | 2387 | 5169 | 3624 |
| Jan. 19, 2002 | Jan. 18, 2002 11:59:59 PM | 48414 | 9176 | 2395 | 5181 | 3632 |
| Jan. 20, 2002 | Jan. 18, 2002 11:59:59 PM | 48414 | 9176 | 2395 | 5181 | 3632 |

Original Data as provided by AMR vendor (Meter stale on entry date Jan. 20, 2002)

| Entry Date | Read Time | CUM | BIN 1 | BIN 2 | BIN 3 | BIN 4 | Read Flag | Tag |
|---|---|---|---|---|---|---|---|---|
| Jan. 17, 2002 | Jan. 16, 2002 11:59:59 PM | 48326 | 9146 | 2380 | 5159 | 3612 | E | RWT |
| Jan. 18, 2002 | Jan. 17, 2002 11:59:59 PM | 48372 | 9162 | 2387 | 5169 | 3624 | G | |
| Jan. 19, 2002 | Jan. 18, 2002 11:59:59 PM | 48414 | 9176 | 2395 | 5181 | 3632 | G | |
| Jan. 20, 2002 | Jan. 18, 2002 11:59:59 PM | 48470 | 9185 | 2402 | 5202 | 3651 | E | WOR |

Readings after being processed by the current invention on Jan. 20, 2002 (Estimation performed 1/2020/02 entry date based on Week Old Read)

| Entry Date | Read Time | CUM | BIN 1 | BIN 2 | BIN 3 | BIN 4 | Read Flag | Tag |
|---|---|---|---|---|---|---|---|---|
| Jan. 17, 2002 | Jan. 16, 2002 11:59:59 PM | 48326 | 9146 | 2380 | 5159 | 3612 | E | RWT |
| Jan. 18, 2002 | Jan. 17, 2002 11:59:59 PM | 48372 | 9162 | 2387 | 5169 | 3624 | G | |
| Jan. 19, 2002 | Jan. 18, 2002 11:59:59 PM | 48414 | 9176 | 2395 | 5181 | 3632 | G | |
| Jan. 20, 2002 | Jan. 18, 2002 11:59:59 PM | 48474 | 9186 | 2403 | 5203 | 3652 | E | CGR |
| Jan. 21, 2002 | Jan. 20, 2002 11:59:59 PM | 48525 | 9237 | 2403 | 5203 | 3652 | G | RWT |

Readings after being processed by the current invention on Jan. 21, 2002 (Re-estimation of Jan. 20, 2002 entry date based on Current Good Read)

In the above example, the CUM value 48470 on Jan. 20, 2002 and its TOU reads 9185, 2402, 5202, 3651 were changed to 48474, 9186, 2403, 5203, 3652 further fine tuning the estimate based in the current day's good reads. It is assumed that the current process is running for entry date Jan. 21, 2002. Although today's reads were previously tagged as RWT (Rounding within threshold), the same are then used to perform re-estimation on past estimates, hence updating the read tag for Jan. 20, 2002 from WOR to CGR.

Figure 14:
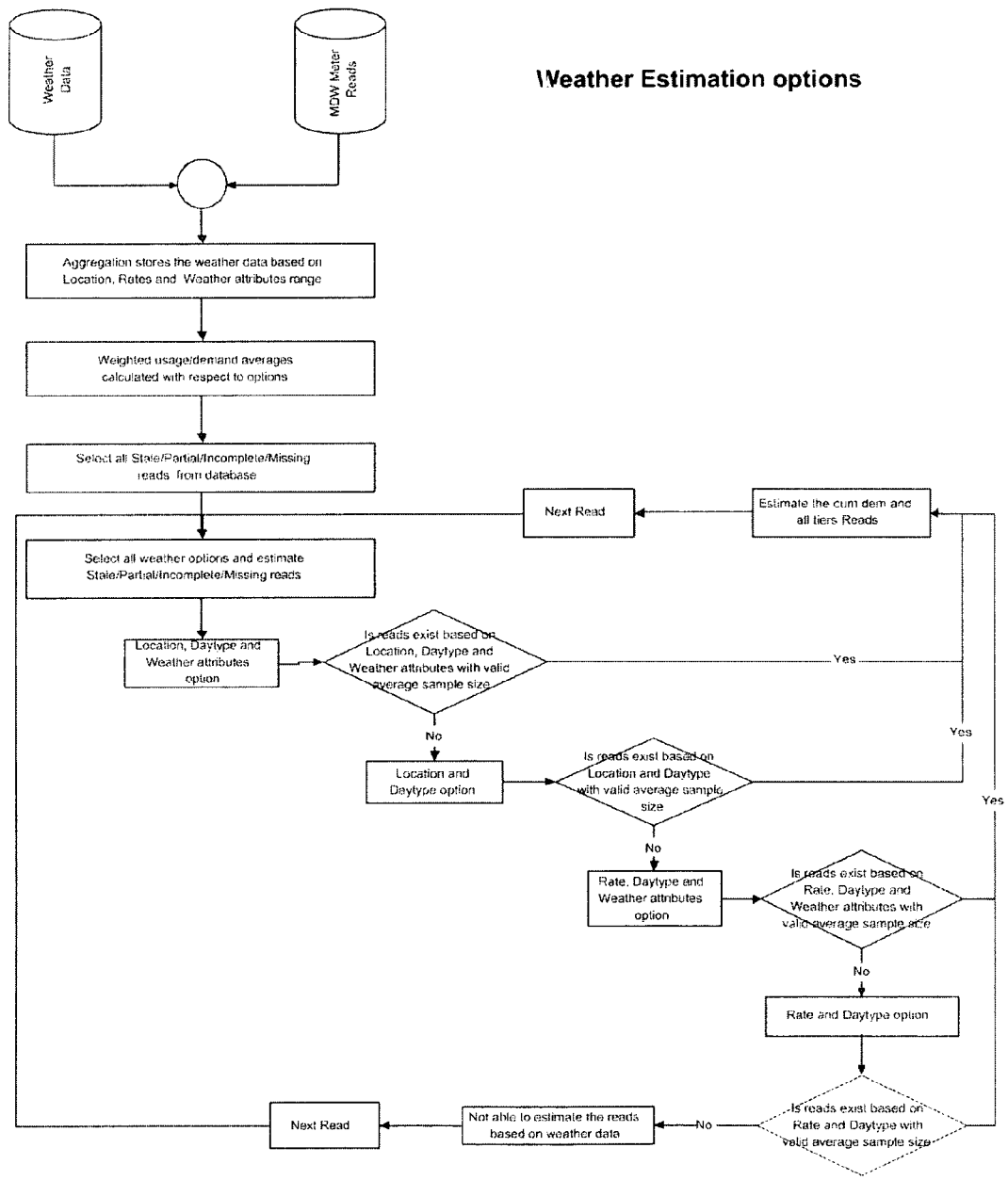
FIG. 14 illustrates in flow chart form a presently preferred embodiment of the present invention. The figure depicts the steps involved in applying one of the rules of the present invention related to a combination of meter read data and weather data.

FIG. 14 is a flow chart depicting the steps of a preferred embodiment of the present invention. In step 1025, weather data (1015) and data stored in meter data warehouse (1020) is aggregated and stored based on location, rates and weather attribution ranges. In step 1030 weighted usage or demand average is calculated with respect to different options. In step 1040 all weather options are selected and stale or partial or incomplete or missing reads are estimated (step 1040.) In step 1045 location, day type and weather attribute options are invoked. If read does not exist based on location, day type and weather attributes with valid average sample size (step 1050) location and day type options are invoked (step 1055). If read does not exist based on location and day type with valid average sample size (step 1060) then rate, attribute and weather attributes option is invoked (step 1065). If read does not exist based on rate, day type and weather attributes with valid average sample size (step 1070) then rate and day type options are invoked (step 1075.) If read does not exist based on rate and day type with valid average sample size (step 1080) and if estimation of reads based on weather data is not possible (step 1085) then the next read is processed (step 1090.) Otherwise, CUM, DEM and all tiered reads are estimated (step 1095.)

The invention claimed is:

1. A meter read loading method for a plurality of utility meters, said method comprising:
    getting current read data for each meter;
    comparing the current read data for each meter to previous read data for the meter;
    applying a set of rules to the current read data for each meter, wherein the set of rules comprise error detection rules, rounding rules, offsetting rules, estimation rules, and allocation rules, and wherein applying the set of rules, comprises:
        detecting errors in current read data; and
        rounding and offsetting current read data so as to ensure that a total consumption of energy data value matches a sum of time of use tiers;
    determining if any of the rules are satisfied;
    storing current read data for each meter in original history tables; and
    tagging the meter based on application of the set of rules.

2. The method of claim 1, wherein tagging includes identifying the current read data for each meter as Good, Stale, Partial, Incomplete or Missing.

3. The method of claim 1, wherein the history tables store cumulative data, demonstrative data and time of use data for each meter.

4. The method according to claim 1 further comprising the steps of:

a. obtaining a list of meters that are to be billed on a same day;
b. obtaining last thirty two days of reads from the history tables;
c. checking if the last billing date's read was tagged for meter replacement;
d. checking whether the meter was replaced; and
e. checking if the meter was reset.

5. The method of claim 4, wherein said meter reset comprises the steps of:
a. obtaining current reads for each meter;
b. obtaining previous day's reads for each meter;
c. comparing the current reads and previous day's reads for each meter;
d. resetting the reads based on the comparison step;
e. tagging each meter as a Reset meter.

6. The method of claim 5, wherein current and previous day's reads for each meter further comprise one cumulative read and at least two time of use reads.

7. The method of claim 5, wherein the comparing step further comprises the steps of:
a. Comparing the current cumulative read with previous day's cumulative read;
b. if the current cumulative read is less than the previous day's cumulative read then determining whether it is a valid rollover for the cumulative read;
c. if it is not a valid rollover for the cumulative read then the cumulative read is reset;
d. comparing a bin 1 cumulative read with previous day's bin 1 cumulative read;
e. if the bin 1 cumulative read is less than the previous day's bin 1 cumulative read then determining whether it is a valid rollover for the bin 1 cumulative read;
f. if it is not a valid rollover for the bin 1 cumulative read then bin 1 is reset;
g. comparing a bin 2 cumulative read with previous day's bin 2 cumulative read;
h. if the bin 2 cumulative read is less than the previous day's bin 2 cumulative read then determining whether it is a valid rollover for the bin 2 cumulative read;
i. if it is not a valid rollover for the bin 2 cumulative read then the bin 2 cumulative read is reset.

8. The method of claim 5 or claim 7, wherein if the cumulative read and one of the bins are reset the meter is tagged as Meter and Bins Reset.

9. The method of claim 5 or claim 7, wherein if the cumulative read has been reset the meter is tagged as Meter Reset.

10. The method of claim 5 or claim 7, wherein if one of the bins have reset and sum of previous day's offset and sum of bins equals cumulative read, the meter is tagged as Partial Bin Reset.

11. The method of claim 5 or claim 7, wherein if one of the bins has reset and sum of previous offset and sum of bins is not equal to cumulative read then the meter is tagged as Virtual Meter Reset.

12. A method of claim 1 further comprising the step of:
a. if current read data is incomplete or partial or stale or missing then tagging the meter as Demand Read Missing.

13. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules, wherein
if current read data is partial read and if estimating cumulative read data based on different options is not possible then the meter is tagged as Partial Did Not Estimate.

14. A meter read loading method for a plurality of utility meters, said method comprising:
getting current read data for each meter:
comparing the current read data for each meter to previous read data for the meter:
applying a set of rules to the current read data for each meter:
determining if any of the rules are satisfied:
storing current read data for each meter in original history tables: and
tagging the meter based on application of the set of rules, wherein
if current read is stale or incomplete or missing and if it is first day's read then the meter is tagged as No Historical Data.

15. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules; wherein:
a. if current read data is not good read data then estimating cumulative read data;
b. if previous read data is good read data, then meter is tagged as Week Old Read.

16. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules, wherein
if previous read data is estimated read data, then the meter is tagged as Week Old Estimates.

17. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules; wherein:
a. if current read data is not good read data then finding the last good read;

b. if last good read data is not found then the meter is tagged as Estimation Threshold Overflow.

18. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules; wherein:
a. if current read is not a good read then finding the last good read
b. if last good read is found and if current date minus last good read is greater than 7 then meter is tagged as Estimation Threshold Overflow.

19. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules; wherein:
a. if current read is a good read and the previous day's read is not a good read then finding the last good read;
b. if last good read is found and if current date minus last good read date is greater than 30, meter is tagged as G-ETO.

20. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and
tagging the meter based on application of the set of rules; wherein:
a. if current read data is good read and previous day's read data is not good read data then finding last good read data; and
b. if last good read data is found and if current date minus last good read date is not greater than 30 then determining whether there are other meters to be checked.

21. A meter read loading method for a plurality of utility meters, said method comprising:
getting current read data for each meter;
comparing the current read data for each meter to previous read data for the meter;
applying a set of rules to the current read data for each meter;
determining if any of the rules are satisfied;
storing current read data for each meter in original history tables; and tagging the meter based on application of the set of rules;
wherein:
a. If current read data is good and the previous day's read data is not good then finding last good read data;
b. if the last good read data is found within threshold then do the Current Good Read calculation between two good reads and the meter is tagged as Current Good Read.

22. A method of claim 1 wherein the meter is tagged as Cannot Calculate Usage.

23. A method of claim 1 wherein the meter is tagged as Bin Did Not Advance.

24. A method of claim 1 wherein the meter is tagged as Estimated Partial Bins.

25. A method of claim 1 wherein the meter is tagged as Rounding with Offset.

26. A method of claim 1 wherein the meter is tagged as Rounding with Rollover.

27. A method of claim 1 wherein the meter is tagged as Change in Offset.

28. A method of claim 1 wherein the meter is tagged as Rounding Within Threshold.

29. A method of claim 1 wherein the meter is tagged as Rollover Not Validated.

30. A method of claim 1 wherein the meter is tagged as Rollover Not Validated.

* * * * *